(12) United States Patent
Christoph et al.

(10) Patent No.: US 10,935,366 B2
(45) Date of Patent: Mar. 2, 2021

(54) METHOD AND DEVICE FOR MEASURING FEATURES ON WORKPIECES

(71) Applicant: WERTH MESSTECHNIK GMBH, Giessen (DE)

(72) Inventors: Ralf Christoph, Giessen (DE); Ingomar Schmidt, Erfurt (DE); Volker Wegner, Staufenberg (DE); Matthias Andräs, Florstadt (DE); Ulrich Neuschaefer-Rube, Braunschweig (DE); Andreas Ettemeyer, Grabs (CH); Mehmet Demirel, Koblach (AT); Sabine Linz-Dittrich, Gamprin-Bendern (LI); Benjamin Hopp, Giessen (DE)

(73) Assignee: WERTH MESSTECHNIK GMBH, Giessen (DE)

( * ) Notice: Subject to any disclaimer, the term of this patent is extended or adjusted under 35 U.S.C. 154(b) by 125 days.

(21) Appl. No.: 15/533,235

(22) PCT Filed: Dec. 11, 2015

(86) PCT No.: PCT/EP2015/079339
§ 371 (c)(1),
(2) Date: Jun. 5, 2017

(87) PCT Pub. No.: WO2016/092053
PCT Pub. Date: Jun. 16, 2016

(65) Prior Publication Data
US 2018/0106595 A1 Apr. 19, 2018

(30) Foreign Application Priority Data

Dec. 12, 2014 (DE) ...................... 10 2014 118 525.0
Jul. 30, 2015 (DE) ...................... 10 2015 112 521.8
Nov. 19, 2015 (DE) ...................... 10 2015 120 060.0

(51) Int. Cl.
*G01B 11/00* (2006.01)
*G01B 5/012* (2006.01)
(Continued)

(52) U.S. Cl.
CPC ............ *G01B 11/007* (2013.01); *G01B 5/012* (2013.01); *G01B 11/245* (2013.01);
(Continued)

(58) Field of Classification Search
CPC .... G01B 11/007; G01B 5/012; G01B 11/245; G01B 2210/50; G06T 7/0004; G06T 2207/30164; H04N 5/369
(Continued)

(56) References Cited

U.S. PATENT DOCUMENTS 6,441,910 B1 8/2002 Christoph
6,646,750 B1 11/2003 Christoph
(Continued)

FOREIGN PATENT DOCUMENTS

CN 101587080 A 11/2009
CN 102575928 A 7/2012
(Continued)

OTHER PUBLICATIONS

Chinese Search Report, dated Feb. 18, 2019, corresponding to Chinese Application No. 201580067568.8.
(Continued)

*Primary Examiner* — Joseph G Ustaris
*Assistant Examiner* — Matthew David Kim
(74) *Attorney, Agent, or Firm* — Ladas & Parry LLP; Malcolm J. MacDonald

(57) ABSTRACT

A method and device for geometrically determining features of a workpiece, having an image processing sensor having a first beam path, the first beam path comprising at least one front optical unit facing the workpiece to be measured, and
(Continued)

Figure 1:
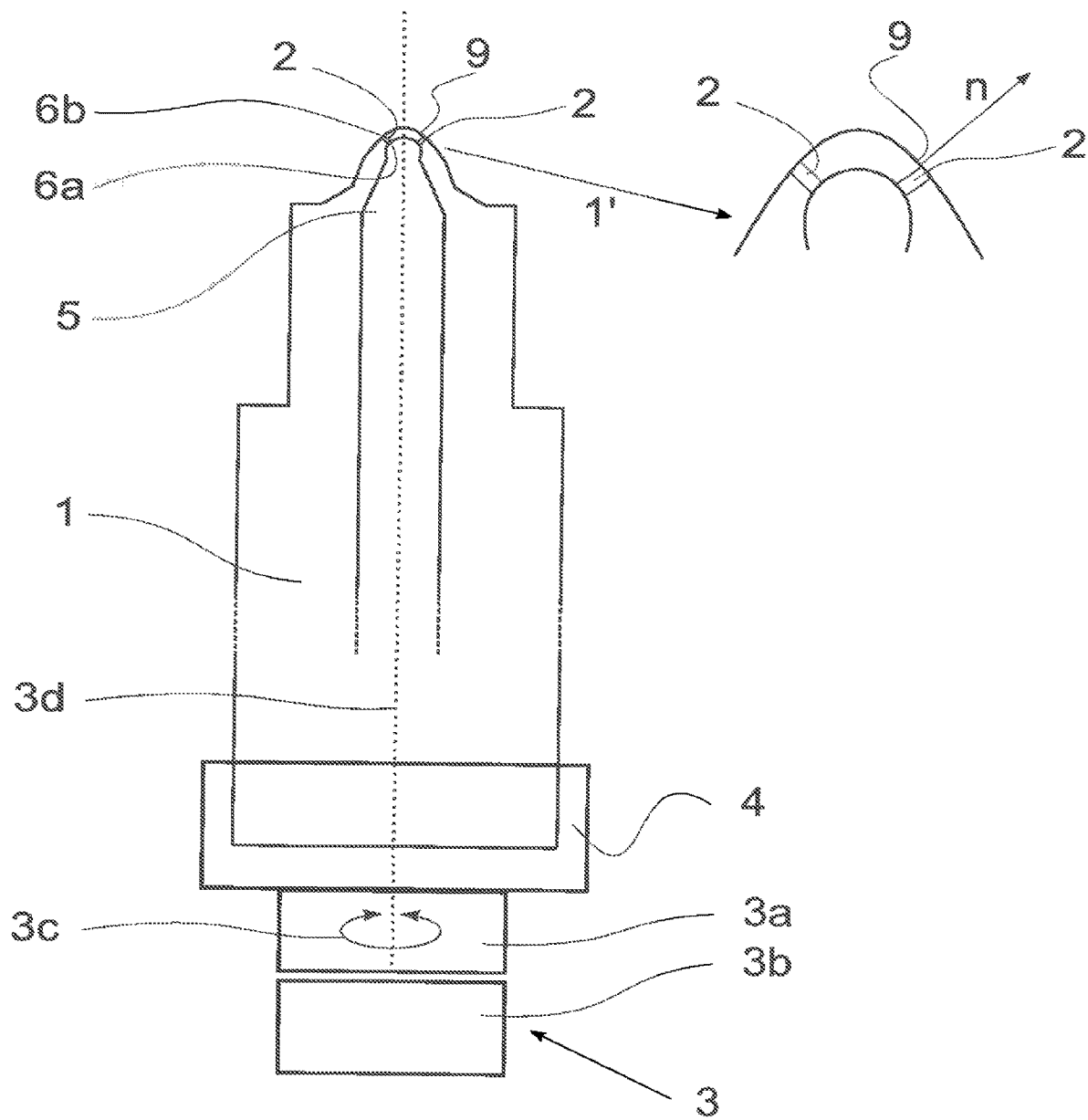

an optical splitter being mounted on the side of the front optical unit facing away from the workpiece. The optical splitter connects a second beam path to the image processing beam path, a common beam path being formed, and the second beam path being associated with a second optical sensor, the image processing sensor and the second sensor being designed to directly measure the surface of the workpiece. The front optical unit is formed as a sphere and/or has a longitudinal chromatic aberration.

21 Claims, 9 Drawing Sheets

(51) Int. Cl.
G01B 11/245 (2006.01)
H04N 5/225 (2006.01)
G06T 7/00 (2017.01)
H04N 5/369 (2011.01)

(52) U.S. Cl.
CPC ......... *G06T 7/0004* (2013.01); *H04N 5/2251* (2013.01); *H04N 5/369* (2013.01); *G01B 2210/50* (2013.01); *G06T 2207/30164* (2013.01)

(58) Field of Classification Search
USPC .......................................................... 348/87
See application file for complete search history.

(56) References Cited

U.S. PATENT DOCUMENTS

| | | | |
|---|---|---|---|
| 7,508,524 B2 | 3/2009 | Mahadevan-Jansen et al. | |
| 8,477,320 B2 | 7/2013 | Stock et al. | |
| 8,736,849 B2 | 5/2014 | Stroessner et al. | |
| 2005/0000102 A1 | 1/2005 | Christoph et al. | |
| 2005/0133378 A1 | 6/2005 | Glock et al. | |
| 2007/0141576 A1* | 6/2007 | Koide | B01L 3/508 435/6.14 |
| 2008/0097225 A1* | 4/2008 | Tearney | A61B 18/22 600/478 |
| 2009/0153839 A1 | 6/2009 | Kay | |
| 2011/0043661 A1* | 2/2011 | Podoleanu | A61B 3/102 348/239 |
| 2012/0156636 A1 | 6/2012 | Stock et al. | |
| 2012/0314206 A1* | 12/2012 | Spizig | G02B 21/006 356/72 |
| 2012/0327221 A1* | 12/2012 | Christoph | G01B 11/007 348/135 |
| 2014/0043468 A1* | 2/2014 | Engel | G01B 11/14 348/135 |
| 2014/0043474 A1* | 2/2014 | Westphal | G01N 21/25 348/136 |
| 2015/0055215 A1* | 2/2015 | Chen | G02B 21/0064 359/386 |
| 2015/0083829 A1 | 3/2015 | Werger | |
| 2016/0377995 A1* | 12/2016 | Fresquet | G03F 7/70733 355/74 |

FOREIGN PATENT DOCUMENTS

| | | |
|---|---|---|
| DE | 198 24 107 A1 | 12/1998 |
| DE | 103 60 080 A1 | 7/2005 |
| DE | 10 2004 022 314 A1 | 12/2005 |
| DE | 10 2009 025 815 A1 | 11/2010 |
| DE | 10 2010 060 833 A1 | 6/2011 |
| DE | 10 2014 117 978 A1 | 6/2015 |
| EP | 0 988 505 B1 | 1/2002 |
| EP | 1 071 921 B1 | 8/2003 |
| EP | 1 082 581 B1 | 7/2004 |
| EP | 1 528 354 A2 | 5/2005 |
| EP | 2 104 833 B1 | 4/2012 |
| WO | 02/25206 A1 | 3/2002 |
| WO | 2004/004973 A1 | 1/2004 |
| WO | 2011/064339 A2 | 6/2011 |

OTHER PUBLICATIONS

US 2012/0156636 A1 is being submitted as an English equivalent of DE 10 2009 025 815 A1.
US 2012/0327221 A1 is being submitted as an English equivalent of DE 10 2010 060 833 A1.
US 2005/0133378 A1 is being submitted as an English equivalent of DE 103 60 080 A1.
US 2015/0083829 A1 is being submitted as an English equivalent of EP 2 753 021 A1.
US 2005/0000102 A1 is being submitted as an English equivalent of EP 0 988 505 B1.
U.S. Pat. No. 6,646,750 B1 is being submitted as an English equivalent of EP 1 071 921 B1.
Non-English International Search Report dated May 17, 2016 for Application No. PCT/EP2015/079339 with English translation.
Espacenet English abstract of EP 1 528 354 A2.
Espacenet English abstract of DE 198 24 107 A1.
Espacenet English abstract of DE 10 2004 022 314 A1.
Espacenet English abstract of WO 2011/064339 A2.

* cited by examiner

METHOD AND DEVICE FOR MEASURING FEATURES ON WORKPIECES

The object of the invention is a method for measuring geometric features and structures on various segments of one or more regions of a workpiece.

A further object of the invention is a device for determining geometric features and/or structures.

For dimensionally measuring complex geometries, various tactile, tactile-optical, optical, or computed tomography sensors are used. Said sensors are preferably operated in coordinate measuring machines (CMMs), and a plurality of sensors are also combined in one machine (multisensor CMM.)

Particularly for measuring so-called micro-features, that is, features such as holes, recesses, gaps, etc. having dimensions in at least one direction, such as the hole diameter or gap width, of significantly less than one millimeter, sensors having correspondingly small contact shape elements such as spheres, discs, tips, etc. are required. A particular challenge occurs when a probe must enter very far into the workpiece, so that the segments to be measured are present far below the directly accessible surface in the particular region or feature.

Typical examples of such microfeatures are the injection orifices on fuel injectors, particularly diesel fuel injectors for passenger cars and commercial vehicles, or on gasoline fuel injectors for passenger cars. The injection orifices are typically produced by means of electrical discharge machining (EDM), such as described in DE10360080A1 from the Bosch corporation, or laser machining such as laser drilling. Hardening takes place subsequently, as found in EP2753821A1 from the Bosch corporation. The inlet radius, that is, the transition between the interior of the fuel injector (also referred to below as a channel) and the injection orifice is often rounded, such as by means of grinding paste, whereby the form errors of the injection orifices are reduced, or hydro-erosive rounding, as found in WO2004004973A1 from the Siemens corporation.

The injection orifices of diesel fuel injectors are inwardly conical, that is, the diameter thereof increases. The so-called conicity factor (K-factor) is used to describe the cone angle, and is typically given in the dimension unit of increase in diameter in 10 µm steps per 1 mm length. K=1 thus means that the radius increases by 10 µm for each millimeter of inward depth. Typical fuel injectors have a K-factor in the range of 0 to 7, for example K=5. Deviating definitions relating to the inlet and outlet diameter of the injection orifice, for example, are also found in the literature. A K-factor can also be indicated for gasoline fuel injectors, but typically the cone angle or half cone angle is indicated, because the length is typically less than 1 mm and the K-factor is impractical. Gasoline fuel injectors typically have an outwardly increasing diameter having cone angles from 3° to 10°, typically 5°, and typically have a recess in the external region for expanding the spray jet. Due to the short length of the injection orifices, that is, the short cone axis, very high measurement accuracy is required for determining the cone angle.

Measurement points for the injection orifices must be recorded on vertical cylinder surfaces or nearly vertical or even undercut, that is, conical surfaces, and the diameter, form error, and roughness must be determined from said points. Due to the small diameter of the injection orifices in the range of about 90 µm (diesel fuel injectors for passenger cars) or about 250 µm (diesel fuel injectors for commercial vehicles) or about 100 µm to 200 µm (gasoline fuel injectors for passenger cars) and the low tolerances in the range of about 5 µm to 20 µm for the diameter at various depths, wherein the maximum depths extend to about 0.7 mm or also to 1.2 mm (diesel fuel injectors for passenger cars) or to about 1.4 mm or also to 1.5 mm (diesel fuel injectors for commercial vehicles) or to about 0.2 mm or also to about 0.4 mm (gasoline fuel injectors for passenger cars, this is currently possible at the required accuracy only by using mechanical probing, wherein only very small deflections are permitted in order to prevent shaft contact. Suitable sensors therefore comprise a contact shape element (also called stylus extension together) present on a stylus shaft brought into contact with the segment of the workpiece to be measured and deflected for recording measurement points. The determination of the deflection is either purely tactile, that is, by transferring the deflection by means of a flexurally rigid stylus shaft to a sensor unit above the stylus shaft (evaluation unit) or optically, particularly by means of an image processing sensor capturing the contact shape element or a target mark associated with said element and present on the stylus shaft. The former tactile sensors are sufficiently known to the person skilled in the art. The latter tactile/optical sensors are described in the following specifications of the applicant.

EP0988505 describes a method and a device wherein a probe element (first target mark) and optionally a further target mark emerge from a stylus extension via a flexurally elastic shaft, the coordinates thereof when deflected being determined by means of an optical sensor.

A similar sensor is described in EP 1 071 921, wherein the contact force is adjusted by means of the rigidity of the flexurally elastic shaft, in that solely the bending length 1 is varied.

An opto-mechanical interface having an adjusting device for a corresponding sensor is described in EP 1 082 581.

DE 198 24 107 describes the use of a corresponding sensor for a surface profiling method.

A corresponding sensor is operated on a rotating or pivoting joint in DE 10 2004 022 314.

PCT/EP01/10826 describes coating a probe element or stylus extension on the side facing away from the sensor in order to generate a luminous mark in the interior of the probe element by bundling the radiation reflected at the coating, said radiation being introduced into the interior of the shaft of the probe element or stylus extension, the length thereof being measured, and a mark associated with the probe element and formed by a darkened region of the luminous shaft of the probe element.

DE 10 2010 060 833 describes a tactile/optical sensor wherein, in addition to determining the position of a contact shape element or at least a target mark associated therewith in the X and/or Y direction of the coordinate measuring machine using a first sensor such as an image processing sensor, a second sensor such as a distance sensor also determines the Z-direction, wherein at least one flexible connecting element is used for mounting the contact shape element and the target mark in a mounting element, said connecting element being penetrated by the beam path of the first sensor in the beam direction, wherein the at least one flexible connecting element is transparent and/or is severely defocused with respect to the first sensor. The distance sensor capturing the deflection in the Z direction (vertical direction) of the contact shape element or at least a target mark associated therewith is proposed to be, for example, an interferometer, particularly an absolutely measuring heterodyne interferometer.

Full reference is made to the disclosed contents of all previously named specifications of the applicant.

The use of such tactile or tactile/optical sensors, however, is limited by the fact that contact with the workpiece is permitted solely by the contact shape element, if the measurement is to be accurate. The stylus shaft in particular, necessarily entering the workpiece, must not contact said workpiece when the contact shape element is deflected (shaft contact). This is particularly critical when the insertion into the workpiece is deep, the diameter of the opening is small, and because the stylus shaft is typically necessarily flexurally elastic due to the small diameter thereof, and only small deflections are permitted, particularly when the angle of inclination of the surfaces to be contacted are different with respect to the center axis of the opening.

The object of the present invention is to dimension the corresponding sensor for dimensional measurements or roughness measurements of micro-features, particularly the dimensions of the contact shape element, the stylus shaft, and optionally the target mark, and to use the same as part of a measurement sequence, such that measurement points are recorded in a plurality of segments (surface lines or circumferential lines or other types of measurement lines or individual measurement points within the injection orifice) without shaft contact in one or more different regions (such as injection orifices) of the workpiece (such as a fuel injector), wherein the different segments particularly can (diesel fuel injectors) but do not necessarily (gasoline fuel injectors) have different angles of inclination with respect to the center axis of the opening and thus to the stylus shaft.

By definition, a region is thus a part of workpiece separated from other regions, wherein only separate insertion is possible in the different regions and wherein one region can comprise a plurality of segments. A segment, in contrast, is a part of a region in which measurement points are to be recorded. The measurement points from one or more segments of a region are linked in order to determine geometric features or structures. The geometric features or structures are circles, cylinders, cones, or other geometric elements and the dimensions associated therewith, such as diameter, length, angle, or other properties such as form error or roughness.

The invention relates to a method for determining geometric features and/or structures on a workpiece by determining measurement points at different segments of one or more regions of the workpiece in the form of at least one opening, one recess, or one offset by means of at least one first sensor, wherein the first sensor comprises at least one stylus extension having a stylus shaft, a contact shape element and preferably a target mark associated with the contact shape element extending from said stylus shaft, wherein the deflection of the contact shape element or the target mark is captured when the contact shape element contacts the workpiece, wherein in order to reach the segment to be measured, the contact shape element of the first sensor plunges into or is adjusted along a region, particularly the opening or recess in the surface of the workpiece facing toward the first sensor, At least some considerations of the object are achieved by a method characterized in that a mechanical alignment takes place between the first sensor and the workpiece prior to the measuring of each of the segments of the region or regions, or prior to the measuring of a segment of the region or regions, to an extent such that contact between the stylus shaft and the workpiece does not occur during the capturing of the geometric features and/or structures.

Mechanical alignment means that the sensor and the workpiece are positioned relative to each other in the translatory (x, y and z directions) and rotational (rotating and tilting) directions. Mechanical alignment is used here for precisely positioning, so that the stylus shaft can enter the narrow opening of the workpiece without collision, in order to subsequently measure one or more segments of the region. A prerequisite is that the exact position of the region in space is known. Mechanical alignment therefore always comprises a metrological step for determining said position of the region. The exact positioning then takes place on the basis of said determination. A step prior to determining the position of the region can also comprise a so-called rough mechanical alignment to the particular region. This means that for capturing the position of the region by metrological means, said region must first be roughly disposed relative to the sensor by positioning. Said position, however, requires at least rough knowledge of the position of the region. Said knowledge is derived from the specified data such as drawing data, for example CAD data, and from capturing or measuring easily accessible features on the exterior of the workpiece, so therefore not from the measurement of the region itself. As a result of the rough alignment, the particularly region is disposed relative to the sensor such that precise capturing of the region can take place. For easily accessible openings, particularly having increasing diameter toward the exterior, the rough mechanical alignment without subsequent capture of the position of the region is sufficient for directly beginning the measurement of the segments of the particular region. The rough mechanical alignment thus implements the mechanical alignment according to the invention in this case. For openings that are difficult to access, particularly increasing in diameter toward the interior, the position of the opening is captured after the rough alignment and then the positioning steps for (fine) mechanical alignment are performed, and then the actual measuring of the segments of the region. Insertion into the workpiece, that is, the workpiece surface, is required for measuring the particular segment. The associated probing depth designates the perpendicular distance between the workpiece surface surrounding the opening and the contact point of the measured workpiece segment and the contact shape element. For a spherical contact shape element and perpendicular contact, said distance approaches the distance between the surface and the center of the contact sphere.

According to a further preferred embodiment of the invention, the diameter of the contact shape element is selected to be smaller than the smallest diameter of the opening along the depth thereof and that the diameter of the contact shape element is additionally selected depending on the maximum probing depth defined by the segments and depending on whether the diameter of the opening increases or decreases in the direction toward the interior of the workpiece, that is, in the inward direction, wherein for a maximum probing depth of 0.6 mm to 1.3 mm and diameter of the opening increasing in the inward direction, the diameter of the contact shape element is selected between 20 µm and 90 µm, preferably 70 µm, and for a maximum probing depth of 1.3 mm to 1.6 mm and diameter of the opening increasing in the inward direction, the diameter of the contact shape element is selected between 90 µm and 200 µm, preferably 150 µm to 200 µm, and for a maximum probing depth of 0.2 mm to 0.4 mm and diameter of the opening decreasing in the inward direction, the diameter of the contact shape element is selected between 90 µm and 200 µm, preferably 90 µm to 150 µm.

According to the invention, the regions can be cylindrical or conical, particularly tapered openings, preferably opening into a channel in the interior of the workpiece, the regions particularly being injection orifices of a gasoline or diesel fuel injector.

The injection orifices are thereby particularly at the same height, that is, distributed uniformly about the circumference at the same position along the center axis of the fuel injector. The rough alignment from region to region can thereby take place by means of a purely rotational motion. The number of injection orifices can be an even or an odd number. Typical fuel injectors comprise 5 (passenger cars) to 14 (marine diesel) injection orifices. The injection orifices typically comprise an angle (elevation angle) not equal to 90° from the center axis. Pivoting of the workpiece is provided for the rough alignment to the elevation angle.

According to an embodiment of the invention, segments are measured at a plurality of regions distributed around the circumference of the workpiece, wherein the workpiece and at least the first sensor are mechanically aligned for each region, preferably for each segment of each region, by means of a rotary/tilt device prior to measuring.

Particularly for conical geometry increasing toward the interior, such as the injection orifices of diesel fuel injectors, alignment can be performed to nearly one single cone surface line, that is, to the center axis of the cone projected onto the cone surface, without shaft contact occurring for the present narrow openings. This particularly requires mechanical alignment in the rotational directions prior to insertion. For other narrow openings having diameters increase toward the exterior, or cylindrical openings, said procedure is also sensible, as every rotation or pivot motion also involves a translational displacement requiring compensation during rotation in the inserted state in order to prevent collisions.

According to the invention, regions can comprise diameters increasing in the direction toward the workpiece interior, that is, inwardly, preferably having a conicity factor (C-factor) of greater than 1 to a maximum of 7, such as 5, and regions are preferably injection orifices of a diesel fuel injector, and wherein a plurality of segments are measured at each region, wherein each segment extends along a conical surface curve, and wherein a mechanical alignment occurs for each segment.

According to a particularly preferred embodiment of the invention, the following steps are performed chronologically in the following sequence prior to measuring the corresponding next segment of an opening:
positioning the contact shape element outside of the opening by means of linear axes, preferably measurement axes of a coordinate measuring machine covering the three spatial directions
rotationally mechanically aligning to the next segment by means of a rotary/tilt device
transversally mechanically aligning perpendicular to the center axis of the opening, preferably on the center axis
transversally mechanically aligning to the segment to be measured by plunging into the opening by positioning by means of linear axes, preferably first in the direction of the center axis and then perpendicular to the center axis in the direction of the segment to be measured.

It is further preferred that each segment to be measured extends over a predominant portion of the depth of the region, but at least in a depth range starting from 0 mm to 0.1 mm below the workpiece surface and ending 0 mm to 0.1 mm above the maximum depth, wherein
the maximum depth of the range is 0.7 mm to 1.2 mm, for a mean diameter of the region from 80 µm to 100 µm, preferably 90 µm, or
the maximum depth of the range is 1.2 mm to 1.5 mm, for a mean diameter of the region from 100 µm to 250 µm.

In contrast to injection orifices of diesel fuel injectors, opening having diameters increasing toward the interior, that is, decreasing toward the exterior, also exist, wherein all conceivable segments are accessible without shaft contact by means of mechanical alignment. The segments can therefore also run along the circumference, deviating from surface lines, or run arbitrarily along the cone surface or cylinder surface of region or the opening. Mechanical alignment to the next region typically also comprises only a rotation.

According to a further preferred embodiment of the invention, regions have diameters decreasing in the direction toward the interior of the workpiece, that is, inwardly, preferably at a taper angle from 3° to 7°, preferably 5°, and preferably regions are injection orifices of a gasoline fuel injector, and wherein a plurality of segments are measured at each region, wherein each segment extends along a conical surface line or along the circumference of the cone or arbitrary along the conical surface, and wherein a single mechanical alignment takes place for all segments of a region.

It is particularly emphasized that positioning of the contact shape element outside of the opening and rotationally mechanically aligning do not occur between measurements of the plurality of segments of each region, and positioning in the direction of the next segment to be measured does occur.

It can therefore also be characteristic that segments to be measured cover a predominant portion of the depth of each region, but at least the depth range starting from 0 mm to 0.1 mm below the workpiece surface or below a recess present at the workpiece surface, and ending 0 mm to 0.1 mm above the maximum depth, wherein the maximum depth of the region is 0.2 mm to 0.4 mm, for a mean diameter of the region of 100 µm to 200 µm.

Particularly for the injection orifices of fuel injectors, the progression of the diameter over the depth, the cone angle (or C-factor), the roughness within the opening, and form error at the circumference or along the surface lines must be determined. To this end, a plurality of measurement points are recorded as single points or by scanning within the segments.

According to a particularly preferred embodiment of the invention, a plurality of measurement points are recorded for each segment by multiple contacting of individual points or scanning, and at least one of the geometric features or structures is calculated from the measurement points of the plurality of segments of a region:
diameter at one or more depths, calculated from at least 3, preferably 4, measurement points at the circumference of each depth, preferably taken from a plurality of scannings along surface lines, or calculated from scanning along the circumference
form error of the measurement points at the circumference for each depth with respect to the best-fit circle calculated from the measurement points at each depth, or with respect to the best-fit cone or best-fit cylinder calculated from measurement points at the circumference at various depths K-factor or cone angle of the best-fit cone calculated from measurement points recorded at the circumference at various depths form error and/or roughness calculated from measurement points at the circumference at a constant depth, preferably from scanning along the circumference form error and/or roughness along segments each running along a surface line, preferably recorded by scanning.

It is preferably provided that at least the first sensor and the workpiece are rotationally mechanically aligned to each other by means of a rotary/tilt device and are transversally mechanically aligned by means of linear axes, preferably the measurement axes of a coordinate measuring machine covering the three spatial directions, preferably the workpiece by means of a rotary/tilt device and at least one linear axis, and the sensor by means of at least two linear axes, so that the surface normal extending away from the surface of each segment encloses an angle α of no greater than 90° with the direction of the stylus shaft leading away from the workpiece.

The surface normal of a segment refers to the normal direction at each contact point between the segment and the contact shape element, that is, the perpendicular to the surface at the point of contact. In the embodiment examples of FIGS. 3 and 4, the surface normal is labeled with the reference numeral 11.

Said setting of the angle α makes it fundamentally possible to perform a measurement without shaft contact. Values of less than 90° consider that even when the contact shape element is deflected, particularly for flexurally elastic stylus shafts and the associated bending under deflection, shaft contact is avoided.

Capturing the position of the opening fundamentally includes determining the center axis of the opening, more precisely the direction in space, and the position of the center of the top entry point into the opening, that is, the entry point of said center axis into the particular opening on the side of the workpiece surface, that is, the center of the opening. For the center axis and center of the opening, the specified values are typically available from the drawing of the workpiece, but often are not ideally produced on the real workpiece, such that collision-free and precise measurement is possible, requiring exact knowledge of the position of the opening. The specified values for the position of the segment to be measured are typically derived from the measuring program, by means of which the tolerances preferably taken from the drawing are to be checked. Due to the typically rotationally symmetrical geometries, the exact position of the segment is less critical, or is sufficiently precise from the mechanical alignment because the position of the segments is related to the position of the openings or regions. The inclination of the segments to the center axis, however, is defined at first only based on the specified values for the cone angle or K-factor from the drawing. If a defined angle is to be set between the stylus shaft and the surface of the segment to be measured, in order to reliably avoid shaft contact and to measure precisely, said value or optionally the iterative measured value for the cone angle or C-factor must be used for the mechanical alignment. For measuring regions increasing in diameter toward the interior, the segment to be measured, that is, the corresponding cone surface angle, is individually aligned, wherein the previously stated angle α is selected at least 0.3°, preferably at least 0.5° less than 90°. For regions increasing in diameter toward the exterior, a constant angle α results for all segments wherein the stylus shaft is aligned to the center axis, corresponding only in this case to the opposite angle of half of the cone angle of the region. Only after corresponding rotational mechanical alignment, and optionally translational mechanical alignment perpendicular to the center axis, insertion into the opening takes place.

According to a preferred embodiment of the invention, the direction of the center axis of the particular region, that is, the center axis, and the entry point of said center axis into the particular opening, that is, the center of the opening, are determined prior to mechanically aligning, and that aligning takes place on the basis of the determined center axis, the determined center of the opening, and the specified value for the position of the segment within the particular region and the specified value of the inclination, that is, the direction of the surface normal, of the particular segment to the center axis, particularly from the specified value of the K-factor or specified value of the cone angle, wherein for regions increasing in diameter inwardly, the rotational mechanical alignment is set by means of the rotary/tilt device separately for segments running along different conic surface lines, wherein a is set to a maximum of 89.7°, preferably a maximum of 89.5°, and for regions increasing in diameter outwardly the rotational mechanical alignment takes place once for all segments of the region by means of the rotary/tilt device, in that the stylus shaft is aligned parallel to the center axis, so that α corresponds to the supplementary angle to half of the cone angle of the region, and the part of the transversal mechanical alignment in which the contact shape element plunges into the opening of the workpiece occurs only afterward.

According to a preferred refinement of the invention, the mechanical aligning is performed iteratively, in that the center axis and the center of the opening are determined again and used for repeating the mechanical alignment and/or in that the K-factor is determined using the first sensor and is used for repeated mechanical alignment in place of the specified value thereof, wherein the mechanical alignment is preferably repeated until the angle between the center axis of the previous alignment and the measured center axis falls below a previously defined limit angle, such as 0.2°, and/or until the difference between the specified value of the K-factor and the measured K-factor falls below a previously defined limit, such as 1.

The position of the opening, that is, the center axis and the center of the opening, is determined either by means of the first sensor or by means of another tactile sensor or an image processing sensor. The determining can also be implemented as a combination of measurements by means of the individual sensors.

According to the invention, therefore, the center axis and the center of the opening can be determined by means of a second sensor implemented as an image processing sensor and/or by means of the first sensor and/or by means of a further tactile sensor, wherein the region is pre-aligned to the sensor in use beforehand using external features of the workpiece and the specified data of the workpiece such as CAD data.

The measurements for determining the center axis and center of the opening different from the actual measurement by means of the first sensor in that due to the lack of precise mechanical alignment, the entire required depth of insertion into the opening cannot be completely reached by means of one sensor, particularly a tactile sensor such as the first sensor. The tactile measurements are therefore preferably performed to no greater than half of the maximum depth, or at the interior end of the opening, so that measurement points present at the transition to the channel are captured by means of the optical image processing sensor. The measurement by means of the image processing sensor in the inlet region, that is, at the bottom end of the region such as the injection orifice, requires good illumination by means of so-called interior light, a diffuse light source inserted in the channel. For inlets rounded by means of grinding paste, however, this proves to be difficult and it is preferred to perform a tactile measurement at half the maximum depth.

In an alternative method using the image processing sensor, the total brightness of the light exiting the opening is maximized by rotating and tilting and optionally displacing perpendicular to the opening. At maximum brightness, the center axis is aligned with the direction of the optical axis of the image processing sensor, said axis in turn being aligned to the stylus shaft. Said method also requires good illumination by means of interior light as well as stable mounting of the workpiece, so that tilting during positioning does not cause interference.

According to an embodiment of the invention, the position (x,y) of the center of the opening perpendicular to the direction (z) of the center axis is defined by the location of the center axis, wherein the center axis is determine according to one of the following three methods:

1. two circles are measured on the opening at different depths and the line connecting the centers of the circles defines the center axis, wherein
   by means of the image processing sensor, one circle is measured at the circumference of the top end of the region facing toward the workpiece surface and one circle at the circumference of the bottom end of the region facing toward the channel, or
   one circle is measured by means of the image processing sensor at the circumference of the top end of the region facing toward the workpiece surface, and one circle is measured by means of the first sensor or the further tactile sensor at approximately half of the maximum depth of the opening, preferably by means of 3, particularly preferably by means of 4 measurement points distributed at the circumference, or
   by means of the first sensor or the further tactile sensor, one circle is measured at the top end of the region facing toward the workpiece surface or no greater than 0.2 mm below said end, and one circle is measured at approximately half the maximum depth of the opening, each preferably by means of 3, particularly preferably by means of 4 measurement points distributed at the circumference;
2. measurement points are recorded by means of the first sensor or the further tactile sensor, preferably by scanning, at at least 3, preferably 4, surface lines distributed at the circumference of the region, said lines extending from the top end of the region facing toward the workpiece surface or no greater than 0.2 mm below said end to approximately half the maximum depth of the opening, and a cone or a cylinder is determined from the measurement points by means of a best-fit calculation, wherein the cone or cylinder axis defines the center axis;
3. the rotary and/or the tile position of the rotary/tilt unit is varied until the intensity of a preferably diffuse light source disposed in the channel of the workpiece as captured by the image processing sensor reaches a maximum, wherein the image processing sensor continuously completely captures the end of the region facing toward the workpiece surface, wherein the workpiece and the image processing sensor are optionally repositioned relative to each other at least perpendicular to the optical axis of the image processing sensor, and then the center axis is defined by the center point of the circle derived from the top end of the region facing toward the workpiece surface and the optical axis of the image processing sensor in the set rotary/tilt setting.

Contour points, that is, the diameter and the center of the opening perpendicular to the center axis, can also be determined by means of the image processing sensor. The position of the center of the opening in the direction of the center axis is derived from one or more measurement points on the workpiece surface directly adjacent to the opening, recorded by means of autofocus measurement, that is, optical distance measurement, such as can also be performed by means of the image processing sensor, or by tactile measurement.

According to the invention, the z position of the center of the opening in the direction of the center axis can be determined by determining at least one measurement point on the surface of the workpiece directly surrounding the opening by means of a distance sensor, preferably an autofocus sensor or Foucault distance sensor, preferably after previous rotational alignment.

Furthermore, when measuring by means of the image processing sensor differentiation must be made between a measurement "on the image." wherein separate measurement windows are present for each measurement point, typically smaller than the entire recorded sensor area, and measurement "in the image", wherein a plurality of measurement points, particularly all measurement points for deriving a feature such as a circle, are captured within one measurement window typically filling nearly the entire sensor area. The measurement at the top end of the region is preferably performed "in the image" and that at the bottom end "on the image." At this stage of alignment, the form error of the injection orifices can already be determined from said measurements and the measurement can be optionally interrupted.

According to a particularly preferred embodiment of the invention, a circle is measured by means of the image processing sensor at the circumference at the top end of the region facing the workpiece surface and/or at the circumference at the bottom end of the region facing the channel, wherein a plurality of measurement points are recorded in each case and a best-fit circle is determined for calculating each of the circles, wherein the measurement at the bottom end is performed under transmitted light illumination implemented by a preferably diffuse light source inserted in the canal and preferably by means of a separate measurement window for each measurement point (measurement on the image) and the measurement at the top end is performed under transmitted light illumination or under incident light illumination and preferably by means of one measurement window encompassing all measurement points (measurement in the image).

It is further preferable if the measurement by means of the image processing sensor takes place before or after or during the measurements of the segments of a region by means of the first sensor, and the plurality of measurement points for each is checked for form error with respect to the best-fit circle calculated from each, and preferably the measurement sequence is interrupted at least for the particular region if a specified maximum form error is exceeded.

According to a further preferred embodiment of the invention, the deflection of the contact shape element at least perpendicular to the stylus shaft and preferably in the direction of the stylus shaft is transmitted by the stylus shaft to a sensor unit disposed above the stylus shaft and captured by the same, wherein the stylus shaft is preferably flexurally rigid.

According to a particularly preferred alternative, however, stylus shafts flexurally elastic at least in segments are proposed, wherein the deflection perpendicular to the stylus shaft is determined by means of image processing. Said method is typically sufficient, as due to the steep segments to be measured, deflection parallel to the stylus shaft is seldom present and can be neglected even for precise measurements.

A fundamental advantage of tactile measurement, including by means of optically capturing the contact shape element, in comparison with purely optical capture of the segments captured by means of the image processing sensor such as the top and bottom ends of the regions, is that any burrs present do not have a shadowing effect on the optical beam path, but rather are measured precisely as well. The shadowing also results in systematic deviations in the purely optical measurement, predominantly at the bottom end.

Said deviations are permissible for determining the location of the center axis, but not for precisely measuring, for example, the diameter.

It is particularly preferred that the capturing of the deflection of the contact shape element or the optionally present target mark perpendicular to the stylus shaft takes place by means of a laterally measuring image processing sensor and the stylus shaft comprises a flexurally elastic segment, and in the direction of the stylus shaft preferably by means of a distance sensor capturing the deflection of a optional further target mark extending from the stylus shaft.

When optically capturing the contact shape element at a large depth, slight systematic deviations can nevertheless occur due to shadowing or contact with the workpiece or the brightness of the image of the contact shape element as a function of the probing depth or the like. It is therefore preferable that the capturing of an additional target mark mounted on the stylus shaft, such as a nearly spherical thickening, be performed, wherein said mark is free of shadowing and is present above the opening at constant brightness even in the inserted state of the contact shape element. For example, the diameter of the contact shape element is 20 µm to 100 µm, particularly 70 µm, the diameter of the target mark is 30 µm to 120 µm, particularly 95 µm, and the distance between the two is 1.3 mm to 1.5 mm, particularly 1.5 mm, particularly in order to measure injection orifices of diesel fuel injectors. The region between the contact shape element and the mark The invention can thus be further characterized in that the target mark is captured and the segment between the contact shape element and the target mark is flexurally rigid in comparison with the segment above the target mark, wherein the distance between the contact shape element and the target mark is selected to be greater than the maximum probing depth, and wherein the diameter of the target mark is preferably selected to be 10% to 40% greater than the diameter of the contact shape element, the contact shape element particularly preferably having a diameter from 60 µm to 80 µm and/or the target mark having a diameter from 85 µm to 100 µm and/or the distance having a length from 1.2 mm to 1.6 mm.

According to a particularly preferred embodiment of the invention, the contact shape element and/or the optionally present target mark are disposed in the optical axis of the optic associated with the image processing sensor and the stylus extension is interchangeable or can be set down, preferably automatically interchangeable or able to be set down at a changeout interface, wherein a common beam path with the image processing sensor is preferably present, at least in the workpiece side of the optic, if the optional distance sensor is present.

It is preferably provided that the first sensor and the optionally present image processing sensor and the optionally present distance sensor are integrated in a coordinate measuring machine, preferably used in a multisensor coordinate measuring machine, together with other sensors, preferably tactile, optical, tactile-optical, or computed tomography sensors, and the image processing sensor and the distance sensor are preferably operated for measuring the workpiece independently of the first sensor when the stylus extension is set down.

The object of an independent invention is a device and method for geometrically determining features on a workpiece by means of an image processing sensor and an optical distance sensor used for directly measuring the workpiece surface or for determining the deflection of a flexurally elastic probe stylus.

According to the known methods for measuring by means of image processing sensors and chromatic distance sensors through the same front optic, such as described in U.S. Pat. No. 8,736,849, it is not provided that the working distance or imaging scale of the image processing sensor used is adjusted, particularly adjusted independently of the beam path of the chromatic distance sensor. A further problem is that when using a common front optic having chromatic longitudinal flaws, imaging errors are present in the image processing beam path and lead to falsified measurement results.

A further object of the present invention is therefore providing means for achieving error-free measuring using an image processing sensor despite using a common front optic having chromatic longitudinal flaws of a chromatic sensor. A coupling between the chromatic sensor and an image processing sensor having a selectively adjustable working distance and imaging scale is particularly implemented thereby.

The object is achieved according to the invention in that the two beam paths of the image processing sensor and the distance sensor are coupled by means of a splitter, particularly a wavelength-selective splitter, and an optic having a chromatic longitudinal flaw, particularly an asphere, is used as the front optic.

A further object of the present invention is working as loss-free as possible when coupling the two beam paths indicated above with respect to the available light power.

To this end, according to the invention, the wavelength-selective splitter or splitters split the spectrum of light so that, for example, the image processing sensor receives only a narrow part of the spectrum and the chromatic sensor receives the remaining part of the spectrum, that is, particularly the entire light coming from the direction of the measured object.

According to the invention, corresponding wavelength-selective splitters such as dichroic or interference filters are present, wherein spectral ranges are divided, particularly producing a combination of band-pass and band-stop filters by cascading two dichroic filters, wherein the two dichroic filters have different separation wavelengths or limit wavelengths.

A further object of the present invention is to set different working distances for the image processing sensor and the second sensor, wherein the simplest possible construction is to be achieved for the drives for displacing the lenses or lens groups.

The object is achieved according to the invention particularly in that one or more lens groups are at least partially jointly displaced in the two beam paths.

A further object of the present invention is to set different working distances with respect to the front optic for the image processing sensor and the distance sensor, particularly for the Foucault distance sensor. This is necessary, for example, when the deflection of a contact shape element mounted in front of the front optic is to be optically determined, wherein the distance sensor and image processing sensor capture the contact shape element or the mark or marks associated with the contact shape element and disposed at different working lengths. Corresponding sensors, such as described in WO2011064339, are particularly implemented such that the contact shape element or a mark disposed above the contact shape element on the stylus, particularly on the stylus shaft, to be captured by means of the image processing sensor is disposed at a greater distance from the front optic than a mark disposed on the top side of the stylus and disposed closer to the front optic, to be captured by means of the distance sensor. This particularly presents the challenge of using styli of different lengths, wherein the working distance of the image processing sensor must be adjustable, wherein particularly the working distance of the distance sensor should remain constant.

The object is achieved according to the invention in that the optics in the two beam paths of the image processing sensor and of the distance sensor are adjustable such that different working distances can be implemented.

The invention relates to a device for geometrically determining features, particularly surface measurement points on a workpiece, comprising an image processing sensor (first sensor) having an image processing sensor beam path (first beam path), the first beam path comprising at least one front lens, such as a front objective or front optic, facing toward the workpiece to be measured, and at least one optical splitter such as a splitting layer, particularly a wavelength selecting splitter, being disposed on the side of the front optic facing away from the workpiece, through which a second beam path is coupled to the image processing beam path and a common beam path is formed in that light passing through the front optic from the direction of the workpiece to be measured is at least partially coupled out of the common beam path into the second beam path, the second beam path being associated with a second optical sensor (second sensor), particularly a distance sensor, preferably a chromatic distance sensor or distance sensor using the Foucault principle, the image processing sensor and the second sensor being implemented for directly measuring the workpiece surface and/or for determining the deflection of a marker, or one marker each, associated with a flexurally elastic probe stylus, characterized in that the front optic is implemented as an asphere and/or the front optic comprises chromatic longitudinal flaws.

Aspheres are particularly suitable, because defined chromatic longitudinal flaws can be implement precisely and easily.

The invention is particularly characterized in that the image processing sensor comprises an image sensor such as a CCD or CMOS camera and at least two separate displaceable lenses or lens groups are disposed in the first beam path between the image sensor and the splitter and/or between the front optic and the splitter for independently adjusting the working distance and imaging scale.

The asphere preferably comprises a distinct chromatic aberration (chromatic longitudinal flaw) and a detector sensitive to wavelength such as a spectrometer is disposed in the second beam path, and wherein at least one splitter is selective of wavelength such that only a limited wavelength range from the spectrum of the light coming from the direction of the workpiece and impinging on the splitter is guided toward the image sensor of the image processing beam path, in that a splitter is implemented such that said splitter reflects or passes the limited wavelength range above an upper wavelength limit, wherein the upper wavelength limit is preferably greater than approximately 600 nanometers, whereby substantially red light passes toward the image sensor, wherein the splitter is preferably dichroic, or in that a splitter is implemented such that said splitter reflects or passes a limited wavelength range below a lower wavelength limit, wherein the lower wavelength limit is preferably less than approximately 500 nanometers, whereby substantially blue light passes toward the image sensor, wherein the splitter is preferably dichroic, or in that a splitter is implemented as a band-pass or band-stop filter, such that said splitter reflects or passes the limited wavelength range above a lower wavelength limit and below an upper wavelength limit, wherein the wavelength range is preferably nearly monochromatic, preferably comprises a spectral width of no greater than 100 nanometers, particularly preferably no greater than 50 nanometers, wherein the splitter preferably comprises at least one interference filter.

It is thereby implemented that the image sensor of the image processing sensor receives only a narrow spectral range, whereby chromatic errors introduced by the front optic are minimized.

The invention is particularly characterized in that the selective wavelength splitter guides the part of the spectrum of the light not guided toward the image sensor into the second beam path, or that the selective wavelength splitter guides the entire spectrum of the light into the second beam path.

It is thereby implemented that as great a portion of the light as possible is available for evaluation, wherein particularly the wavelength-sensitive detector present in the second beam path receives the broad light spectrum required for evaluating the distance by means of the chromatic distance sensor.

According to the invention, a neutral splitter for coupling the second beam path is preferably disposed between the at least one wavelength-selective splitter and the front optic, wherein the second beam path preferably comprises a broadband light source, the light thereof being coupled toward the workpiece, and particularly preferably the wavelength-selective splitter is dichroic or is a color filter.

By using the neutral splitter, the entire wavelength spectrum is available for the chromatic distance sensor. Therefore only one dichroic or color filter is needed for minimizing the chromatic error in the image processing beam path.

Furthermore, at least one broadband light source and means for coupling into the first and/or second beam path are present for illuminating the region of the workpiece or probe stylus captured by the front optic, and preferably at least one further light source and means for coupling into the first and/or second beam path are present, wherein the spectral portion of the further light source largely overlaps the adjacent wavelength range guided toward the image sensor by the wavelength-selective splitter.

The invention is further characterized in that the asphere comprises a distinctive chromatic aberration (chromatic longitudinal flaw) and a wavelength-sensitive detector such as a spectrometer is disposed in the second beam path, and wherein two wavelength-sensitive splitters, preferably dichroic, are disposed one after the other in the common beam path and each split the spectrum of the light impinging on the splitters from the direction of the of the workpiece at a limit wavelength, thus reflecting above said limit and passing below said limit or vice versa, wherein the two splitters have different limit wavelengths, the difference between the limit wavelengths preferably being less than 100 nanometers, particularly preferably below 50 nanometers, and that the spectral range between the limit wavelengths is guided toward the image sensors and the remaining spectral range is guided toward the wavelength-sensitive detector.

According to the above proposal, no loss of light power occurs, and the device can use standard components such as dichroic filters and is thus particularly low in cost. By selecting the two limit wavelengths, the portion directed to the image sensor can be adjusted, so that errors due to the chromatic aberrations in the image sensor beam path can be deliberately adjusted and minimized.

The invention is particularly characterized in that the light of the two spectral ranges not guided toward the image sensor
- is coupled into different optical fibers, wherein each optical fiber leads to a separate wavelength-sensitive detector or optical fibers are coupled and guided to a wavelength-sensitive detector, or
- is deflected by setting the inclination of the dichroic splitter, wherein the corresponding light is light reflected at the dichroic splitter, and/or by a deflecting mirror and/or optic, to largely the same range as a wavelength-sensitive detector or is coupled into an optical fiber leading to a wavelength-sensitive detector.

According to a particularly preferred embodiment of the invention, the first and second beam path and thus the first and second sensor comprise different working distances relative to the front optic, wherein the working distance of the image processing sensor can be set independently of the working distance of the second sensor.

It is thereby possible to set the working distance of the image processing sensor independently of the working distance of the distance sensor for styli of different lengths of a flexurally elastic stylus extension or a flexurally elastic stylus.

It is particularly preferred that the second beam path comprises at least one lens or lens group by means of which a working distance deviating from, particularly shorter than, the beam path of the image processing sensor is implemented.

The invention is further characterized in that the second beam path comprises at least two separate displaceable lenses or lens groups for independently setting the working distance and imaging scale, wherein lenses or lens groups of the second beam path are displaceable independently of lenses or lens groups of the first beam path or at least one lens or lens group of the first beam path is displaceable together with at least one lens or lens group of the second beam path, particularly preferably one lens or lens group of the first is displaceable together with one lens or lens each of the second beam path.

The invention is particularly characterized in that the splitter is dichroic, wherein the second beam path is associated with a distance sensor based on the Foucault principle and comprises a narrow-band light source and the splitter guides the light of the narrow-band light source to the workpiece and guides the same narrow-band light reflected by the workpiece back to the second beam path, and wherein the splitter guides light form a second light source associated with the image processing sensor to the workpiece, the light thereof being reflected into the beam path of the image processing sensor, and guides at least part of the spectrum of the light reflected by the workpiece toward the image sensor.

According to the invention, the flexurally elastic probe stylus having at least one contact shape element for contacting the workpiece is or can be preferably disposed in front of the front optic, wherein the probe stylus comprises at least one first marker associated with the probe stylus or contact shape element, preferably at the top end of the probe stylus, said marker being captured by the second beam path of the optical distance sensor, and wherein the probe stylus preferably comprises a second marker associated with the probe stylus or contact shape element and disposed on the probe stylus above the contact shape element, wherein the contact shape element or the second marker is captured by the beam path of the image processing sensor and wherein the first and second sensor have different working distances with respect to the front optic.

The object is further achieved according to the invention by means of a method for geometrically determining features, particularly surface measurement points on a workpiece, using the device described above, characterized in that measurement points are recorded directly on the surface of the workpiece selectively by means of the image processing sensor or the chromatic sensor, wherein only a narrow-band spectral range, preferably no greater than 100 nanometers wide, particularly preferably no greater than 50 nanometers wide, such as the blue range between about 450 and 500 nanometers, of the light reflected by the workpiece is guided by means of a wavelength-selective splitter to the image sensor of the image processing sensor for analysis, and a broad-band spectral range or plurality of spectral ranges of the light reflected by the workpiece is guided by means of a wavelength-selective or neutral splitter to the chromatic sensor.

The use of the blue range for the image processing sensor has the advantage that due to the short wavelength in comparison with, for example, the red range, a higher structural resolution can be achieved. The invention is not, however, limited to the blue range. All other ranges of the visible spectrum or receivable by the image sensor are provided.

The object is further achieved according to the invention by means of a method for geometrically determining features, particularly surface measurement points on a workpiece using the above device, characterized in that measurement points are recorded directly on the surface of the workpiece, alternatively by means of the image processing sensor or the distance sensor using the Foucault principle, wherein the working distance for the image processing sensor and the Foucault sensor are set by separately adjusting at least two each of the lenses or lens groups present in the associated beam paths, wherein
- lenses or lens groups of the second beam path are displaced independently of lenses or lens groups of the first beam path, or
- at least one lens or lens group of the first beam path is displaced together with at least one lens or lens group of the second beam path, or
- one lens or lens group of the first beam path is displaced together with one lens or lens group of the second beam path, The object is further achieved according to the invention by means of a method for geometrically determining features, particularly surface measurement points on a workpiece, using the previously described device, characterized in that measurement points are recorded when the contact shape element makes contact with the working distance, wherein probe styli of different lengths are used, and the working distance of the image processing sensor is adjusted to the probe stylus being used in each case by separately adjusting at least two lenses or lens groups present in the first beam path, wherein preferably lenses or lens groups of the first beam path are displaced independently of lenses or lens groups of the second beam path, or at least one lens or lens group of the first beam path is displaced together with at least one lens or lens group of the second beam path, or one lens or lens group of the first beam path is displaced together with one lens or lens group of the second beam path, wherein different working distances are preferably set for the image processing sensor and the Foucault sensor, particularly a shorter working distance for the Foucault sensor than for the image processing sensor.

The object of an independent invention is a method and a device for determining the location of measurement points on a workpiece surface (surface points) using a highly accurate optical distance sensor such as an interferometer.

For the known interferometric or similarly highly accurate optical methods for measuring distance, the measurement range and range of unambiguity of the raw signals of the sensor is typically limited to a few micrometers or less. Therefore said sensors are unsuitable for coordinate measuring technology on complex workpieces.

Homodyne interferometers work at one wavelength, typically emitted by a laser. The range of unambiguity for a homodyne interferometer is linked to the wavelength of the signals used for demodulating the phase location (sine and/or cosine signal) observing the interferometer strips passing through. Typically two signals from two offset receivers are used (one sine and one cosine signal for 90° phase offset), in order to increase the range of unambiguity of the derived phase location to one full wavelength. In general we refer to the range of unambiguity here (the phase location) as the interference order of the interferometer or the interference order of the interference strips. The rate of motion of the strips (number of strips passing through) in relation to the motion of the measuring reflector or the surface targeted by the measurement beam depends on the construction of the interferometer. For a so-called Lambda/2 interferometer, the path difference between the measurement and reference beams changes at twice the rate of the change in measuring reflector position. The range of unambiguity is therefore Lambda/2, that is, only about 200-350 nm for visible light. For Lambda/4 interferometers, only half of said range is available, etc. The low range of unambiguity limits the use of corresponding interferometers to short measurement paths, namely precisely one interference order, or requires that the measurement signal be uninterrupted during the measurement, so that the number of strips passing through and thus of sine waves, that is, the interference orders passed through, can also be counted. In addition, no absolute measurement can be performed using said type, but only a relative measurement. Said features are significant limitations for measuring workpieces, because the measurement signal is interrupted at steps or even at too great a surface inclination. It is further disadvantageous that the corresponding evaluation electronics comprise only a limited bandwidth and too rapid motions lead to signal loss. The rapid displacement between two positions on the workpiece or rapid scanning, such as is often typical in coordinate measuring technology, is thus not possible.

Heterodyne interferometers work at two or more wavelengths and allow absolute measurements in certain ranges. The use of a second wavelength produces a synthetic wavelength (beat) for evaluation, whereby the range of unambiguity is somewhat increased, up to a few micrometers depending on the wavelengths selected. Greater measurement ranges are possible, but reduce the accuracy, such that other absolutely measuring sensors having greater measurement ranges, such as distance sensors referred to here as the second distance sensor, can be used. The accuracy can be improved by additionally evaluating the phase location of the interference signal from one wavelength.

For short-coherence interferometers or optical coherence tomography, a slight increase in the range of unambiguity results from the use of a plurality of wavelengths. Here as well, however, the accuracy decreases as the range of unambiguity increases.

A method for resolving a measurement ambiguity is described in EP2104833, wherein a focus detector arrangement is used for maintaining the measurement point of a partial coherence interferometer defined on one side of the origin. The measurement range thereby nevertheless remains limited to the range of unambiguity of the interferometer.

A further object of the present invention is to perform the measurement by means of an interferometer or other highly accurate sensor at the greatest possible accuracy, whereby a lower range of unambiguity does indeed result. At the same time, it should be ensured that the interferometer signal can be interrupted between the measurements on individual regions of the workpiece, such as when traversing edges or steps or locations of great surface inclination, or sometimes even during the measurement, such as scanning at high speed transverse to the measurement direction, without the reference to the coordinate system of the coordinate measuring machine being lost.

The object of the invention is achieved in that the surface of the workpiece is simultaneously captured by means of a (second) distance sensor comprising a greater measurement range, and thereby a greater range of unambiguity than the interferometer, in order to implement an association of the interferometer signal with the correct position with reference to the coordinate system of the coordinate measuring machine after an interruption in the interferometer signal. The second distance sensor must only be accurate enough to determine the interference order of each interferometer. The exact measured value, such as the phase location of the raw signal or the beat, is taken from the interferometer signal. The object is thus achieved in that a second distance sensor comprising a lower accuracy than the interferometer is used, but the accuracy thereof is high enough to decide in which interference order the interferometer is present. The accuracy of the second distance sensor should be at least somewhat greater than half of the range of unambiguity of the interferometer in order to be able to reliably determine which interference order is present in conjunction with the interferometer signal. If the interferometer signal is precisely in the center of the range of unambiguity and the accuracy of the distance sensor is precisely one half of one interference order, then it cannot quite be decided which interference order is present.

The object is achieved according to the invention by a method for determining the position of measurement points on a workpiece surface (surface points) by means of a first optical distance sensor comprising a plurality of ranges of unambiguity, preferably an interferometric sensor (interferometer) having interference orders as ranges of unambiguity, and a second optical distance sensor comprising a measurement range having at least one range of unambiguity, the first and the second optical distance sensor preferably being used in a coordinate measuring machine comprising measurement axes for relative displacements between the workpiece and the distance sensors, characterized in that the first distance sensor has a higher precision, particularly higher resolution, in the measurement direction and/or perpendicular to the measurement direction, than the second distance sensor, and the second distance sensor has a greater measurement range and/or range of unambiguity in the measurement direction than one of the ranges of unambiguity of the first distance sensor, and wherein in a first measurement mode the first distance sensor and the second distance sensor capture the workpiece surface simultaneously, particularly are aligned to overlapping regions of the workpiece surface, and wherein in the first measurement mode the measured distance value used for determining the position of each measurement point is derived in that the corresponding measured value of the first distance sensor is assigned to a range of unambiguity using the measured value simultaneously captured by the second distance sensor, and the location of the measurement point is determined from the assigned range of unambiguity (interference order) and the measured value of the first distance sensor, and preferably by means of the relative position between the workpiece and the distance sensors determined by means of the measurement axes.

The previously described method according to the invention and corresponding devices can also be used for performing the known tactile-optical measurement at high accuracy.

Corresponding tactile-optical methods and devices are indicated above. The lateral measurement (in the X and/or Y direction) of the deflection or position of a contact shape element or mark associated therewith (first mark) by means of an image processing sensor is described in EP0988505. The expansion to include measuring the perpendicular deflection or location (in the Z direction) of a further mark associated with the contact shape element (second mark) by means of an optical distance sensor is described, for example, in DE 10 2010 060 833. Said optical distance sensor can be implemented as a heterodyne interferometer. The capturing of the deflection of the first mark in the perpendicular direction by an interferometer is also described in DE102014111086, whereby the advantage results that the contact shape element (potentially the first mark) is captured directly and measurement deviations potentially arising between the contact element and the second mark, such as in case of flexing of the stylus extension from which the contact shape element and the second mark emerge, when contacting the workpiece to be measured by means of the contact shape element. Full reference is made here to DE102014111086 (serving as priority for DE102014117978A1).

A disadvantage of the method of the prior art described above is that, just as for capturing surface points, previously indicated limitations exists for the use of interferometers. A further object of the present invention is to perform the tactile-optical measurement at higher accuracy, particularly using an interferometer, wherein the measurement range is preferably increased beyond the range of unambiguity of the interferometer in comparison with the prior art, wherein the interferometer is used for measuring independently.

In order to avoid the limitations indicated above, the interferometric measurement is in turn assigned to a range of unambiguity by means of a second optical distance sensor. Because it has proven difficult to capture the same mark or the contact shape element of a tactile/optical sensor by means of both optical distance sensors, separate marks proceed from a probe extension, for example a fiber such as an optical fiber, particularly a flexible probe extension, and are spaced apart from each other in the measurement direction, that is the perpendicular or Z direction of the preferably used coordinate measuring machine. Measurement deviations between the two optical distance sensors thereby first arise when the probe extension is flexurally deflected. If said deviations remain small enough, however, which can be implemented by appropriate dimensioning with respect to the length, diameter, and rigidity, and by appropriate deflection when the workpiece is contacted by means of the contact shape element, then the correct interference order will nevertheless be associated with the first distance sensor by means of the second distance sensor. The dimensioning and selection of the deflection had therefore preferably taken place such that the deviation between the measured distance values of the two optical distance sensors is less than one interference order, particularly less than one half of an interference order, or less, depending on the type of interferometer.

The object is thus achieved according to the invention by means of a method for determining the position of measurement points on a workpiece surface (surface points) by means of a tactile/optical sensor comprising at least one first A distance sensor and preferably comprising a laterally measuring optical sensor such as an image processing sensor, the tactile/optical sensor comprising a contact shape element extending from a probe extension, preferably a flexible probe extension, for contacting the workpiece, the contact shape element or a marker associated with the contact shape element extending from the probe extension on the side of the contact shape element facing away from the workpiece forming a first marker, and a second marker such as a mirror or splitting layer such as a dichroic splitter extending from the probe extension and being disposed on the side of the first mark facing away from the workpiece, the tactile/optical sensor preferably being used in a coordinate measuring machine comprising measurement axes for the relative displacement between the workpiece and the tactile/optical sensor, and the first optical distance sensor capturing the first marker, preferably the contact shape element, and determining the position thereof in the vertical direction, such as the Z direction of the coordinate measuring machine, and the laterally measuring optical sensor preferably capturing the first marker, preferably the contact shape element, and determining the position thereof in one or two lateral directions, particularly the direction or directions running perpendicular to the measurement direction of the first or second optical distance sensor, such as the X and/or Y direction of the coordinate measuring machine, and the location of the measurement point in the lateral direction or directions being determined therefrom, preferably from the relative position between the workpiece and the tactile/optical sensor determined by means of the measurement axes, characterized in that the tactile/optical sensor comprises a second optical distance sensor for capturing the second marker and for determining the position thereof in the vertical direction, such as the Z direction of the coordinate measuring machine, wherein the first optical distance sensor comprises a plurality of successive ranges of unambiguity in the measurement direction, and is preferably an interferometric sensor (interferometer) having interference orders as ranges of unambiguity, such as particularly a homodyne interferometer, and wherein the second optical distance sensor comprises a measurement range having at least one range of unambiguity, and wherein the first distance sensor has a higher precision, particularly higher resolution, in the measurement direction and/or perpendicular to the measurement direction, than the second distance sensor, and the second distance sensor has a greater measurement range and/or range of unambiguity in the measurement direction than one of the ranges of unambiguity of the first distance sensor, and wherein the measured distance value for the position of the first marker in the vertical direction, such as the Z direction, is derived in a tactile-optical measurement mode for determining the location of each of the measurement points contacted by the contact shape element, in that the particular measured value of the first distance sensor is assigned to a range of unambiguity of the first distance sensor using the simultaneously captured measured value of the second distance sensor, and the position of the first marker in the vertical direction is determined from the assigned range of unambiguity (interference order) and the measured value of the first sensor, and the location of the measurement point in the vertical direction is determined therefrom, preferably by means of the relative position between the workpiece and the tactile-optical sensor determined by means of the measurement axes.

The alignment to mutually overlapping regions of the workpiece surface, particularly the same region, is necessary so that the measurements take place at the same location. The maximum deviation of the measurement spot centers or centroids should thereby not be greater than the radius of the larger measurement spot. The measurement spots of the two sensors, that is, the region of the workpiece from which the reflected radiation enters the evaluation of the particular sensor, can be different in size. The measurement range is the region that can be captured in the measurement direction. Simultaneous measuring means that, for example, the use of a trigger or pulse generator causes the data recording of both sensors to happen at the same time. Depending on the measuring speed and surface condition, however, a slight time offset is permissible, because the second sensor need only detect the interference order.

The invention is particularly characterized in that the accuracy of the second distance sensor is better than half the range of unambiguity of the first distance sensor.

I is preferably provided that, in a second measurement mode, the first and/or the second distance sensor selectively determines the location of surface points independently of the other distance sensor, wherein the optionally present probe extension is removed, preferably automatically set down in a parking station.

The invention is particularly characterized in that an interferometer, particularly a homodyne interferometer or heterodyne interferometer or white-light interferometer or short-coherence interferometer or sensor using the principle of optical coherence tomography is used as the first distance sensor.

According to the invention, the laser distance sensor using the Foucault principle or a chromatic, particularly chromatic confocal sensor or autofocus sensor or focus variation sensor or confocal sensor or white-light sensor or white-light interferometer or short-coherence interferometer or triangulation sensor or laser line sensor or photogrammetric sensor or rigid or sample projection sensor or stereo camera or stereoscopic sensor or light-field camera is preferably used as the second distance sensor.

Furthermore, the first and/or second distance sensor measures points, particularly comprising round or elliptical measurement spots on the workpiece surface, or optionally the second distance sensor on the second marker, having an area of less than one square millimeter, preferably smaller than 0.5 mm^2.

The invention is further characterized in that a range of unambiguity of the second distance sensor is assigned to the second distance sensor using at least one further sensor measuring simultaneously, particularly a further optical distance sensor, having a greater measurement range and/or range of unambiguity in the measurement direction than one range of unambiguity of the second distance sensor, in order to determine the measured value of the second distance sensor.

A device according to the invention for determining the location of measurement points on a workpiece surface (surface points), comprising a first optical distance sensor comprising a plurality of successive ranges of unambiguity in the measurement direction, preferably an interferometric sensor (interferometer) having interference orders as ranges of unambiguity, and a second optical distance sensor comprising a measurement range having at least one range of unambiguity, the first and the second optical distance sensor preferably being integrated in a coordinate measuring machine comprising measurement axes for the relative displacement between the workpiece and the distance sensor, is characterized in that the first distance sensor has a higher precision, particularly higher resolution, in the measurement direction and/or perpendicular to the measurement direction, than the second distance sensor, and the second distance sensor has a greater measurement range and/or range of unambiguity in the measurement direction than one of the ranges of unambiguity of the first distance sensor, and wherein the device is implemented such that the first and the second distance sensors capture the workpiece surface simultaneously in a first measurement mode and the measured distance value for determining the position of each measurement point can be derived in that a range of unambiguity of the first distance sensor can be assigned to the particular measured value of the first distance sensor using the measured value of the second distance sensor captured simultaneously in each case, and the location of the measurement point can be determined from the assigned range of unambiguity (interference order) and the measured value of the first sensor, and preferably by means of the relative position between the workpiece and the distance sensors determined by means of the measurement axes.

A device according to the invention for determining the position of measurement points on a workpiece surface (surface points) by means of a tactile/optical sensor comprising at least one first optical distance sensor and preferably comprising a laterally measuring optical sensor such as an image processing sensor, the tactile/optical sensor comprising a contact shape element extending from a probe extension, preferably a flexible probe extension, for contacting the workpiece, the contact shape element or a marker associated with the contact shape element extending from the probe extension on the side of the contact shape element facing away from the workpiece forming a first marker, and a second marker such as a mirror or splitting layer such as a dichroic splitter extending from the probe extension and being disposed on the side of the first mark facing away from the workpiece, the tactile/optical sensor preferably being integrated in a coordinate measuring machine comprising measurement axes for the relative displacement between the workpiece and the tactile/optical sensor, and the first optical distance sensor being implemented for capturing the first marker, preferably the contact shape element, and determining the position thereof in the vertical direction, such as the Z direction of the coordinate measuring machine, and the laterally measuring optical sensor preferably being implemented for capturing the first marker, preferably the contact shape element, and determining the position thereof in one or two lateral directions, particularly the direction or directions running perpendicular to the measurement direction of the first or second optical distance sensor, such as the X and/or Y direction of the coordinate measuring machine, and the location of the measurement point in the lateral direction or directions being determined therefrom, preferably from the relative position between the workpiece and the tactile/optical sensor determined by means of the measurement axes, is characterized in that the tactile/optical sensor comprises a second optical distance sensor implemented for capturing the second marker and for determining the position thereof in the vertical direction, such as the Z direction of the coordinate measuring machine, wherein the first optical distance sensor comprises a plurality of successive ranges of unambiguity in the measurement direction, and is preferably an interferometric sensor (interferometer) having interference orders as ranges of unambiguity, such as particularly a homodyne interferometer, and wherein the second optical distance sensor comprises a measurement range having at least one range of unambiguity, and wherein the first distance sensor has a higher precision, particularly higher resolution, in the measurement direction and/or perpendicular to the measurement direction, than the second distance sensor, and the second distance sensor has a greater measurement range and/or range of unambiguity in the measurement direction than one of the ranges of unambiguity of the first distance sensor, and wherein the measured distance value for the position of the first marker in the vertical direction, such as the Z direction, can be derived in a tactile-optical measuring mode for determining the location of each of the measurement points contacted by the contact shape element, in that the particular measured value of the first distance sensor can be assigned to a range of unambiguity of the first distance sensor using the simultaneously captured measured value of the second distance sensor, and the position of the first marker in the vertical direction is determined from the assigned range of unambiguity (interference order) and the measured value of the first sensor, and the location of the measurement point in the vertical direction can be determined therefrom, preferably by means of the relative position between the workpiece and the tactile-optical sensor determined by means of the measurement axes.

The invention is particularly characterized in that the first and the second distance sensors are aligned to mutually overlapping regions of the workpiece surface, particularly comprise measurement spots having the same centroid, in that the first and the second distance sensor at least partially comprise a common beam path, particularly comprise a common front optic.

According to the invention, the first and the second distance sensor preferably proceed from a common unit, wherein the unit and the workpiece or a workpiece fixture can be adjusted relative to each other by means of the measurement axes of the coordinate measuring machine.

The invention is further characterized in that the first and/or the second distance sensor are implemented for determining the position of surface points independently of the other distance sensor in a selectable second measurement mode, wherein the optionally present probe extension can be removed, preferably automatically set down in a parking station.

The features found in the claims can optionally be combined arbitrarily, regardless of the references considered in the claims.

Further details, advantages, and features of the inventions arise not only from the claims, the features to be found therein—as such and/or in combination—but also from the following description of the drawings.

Figure 2:
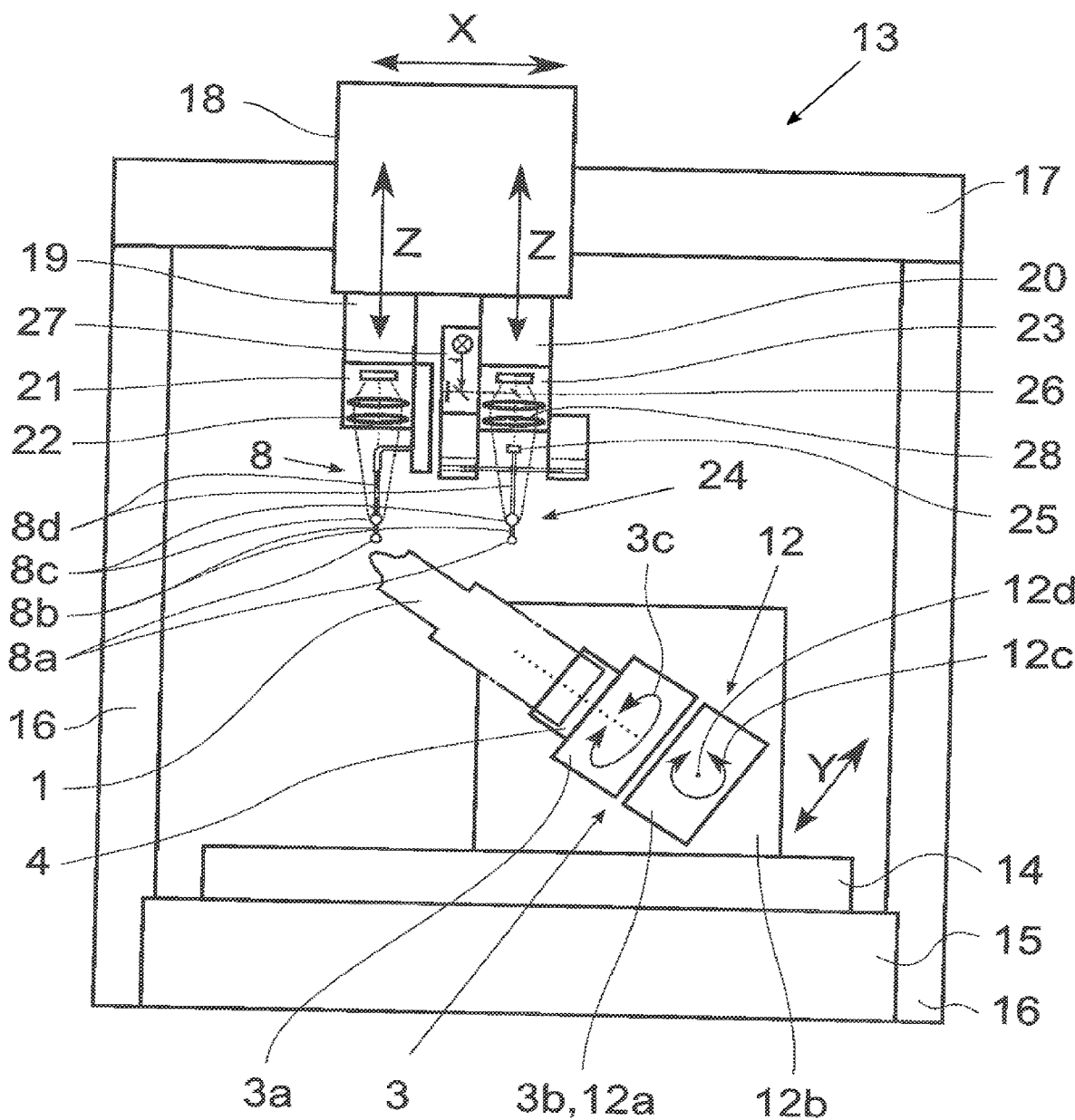
Figure 4A:
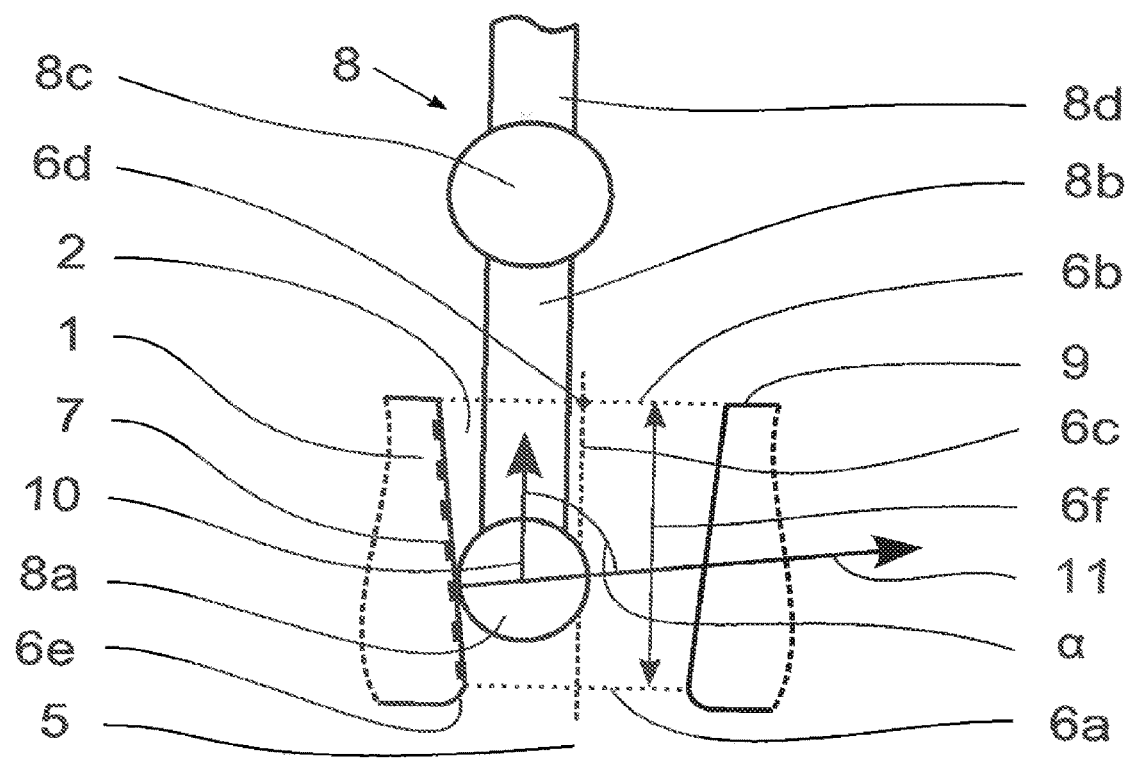
Figure 4B:
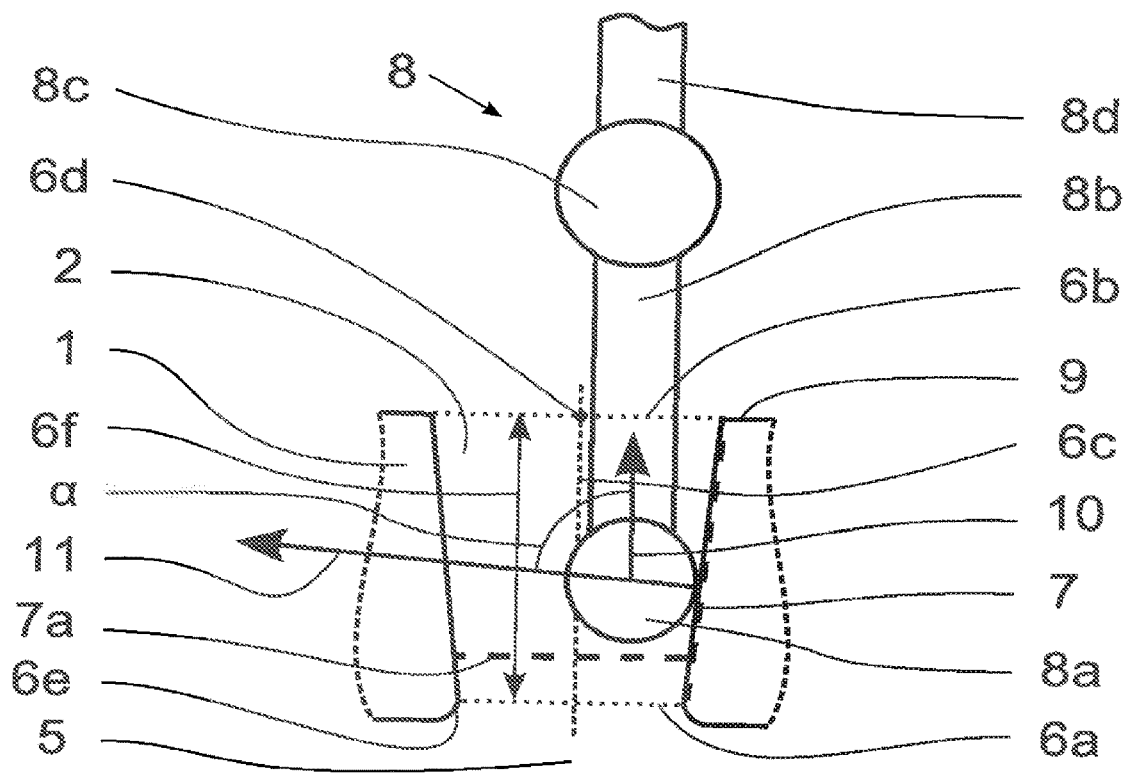
Figure 5:
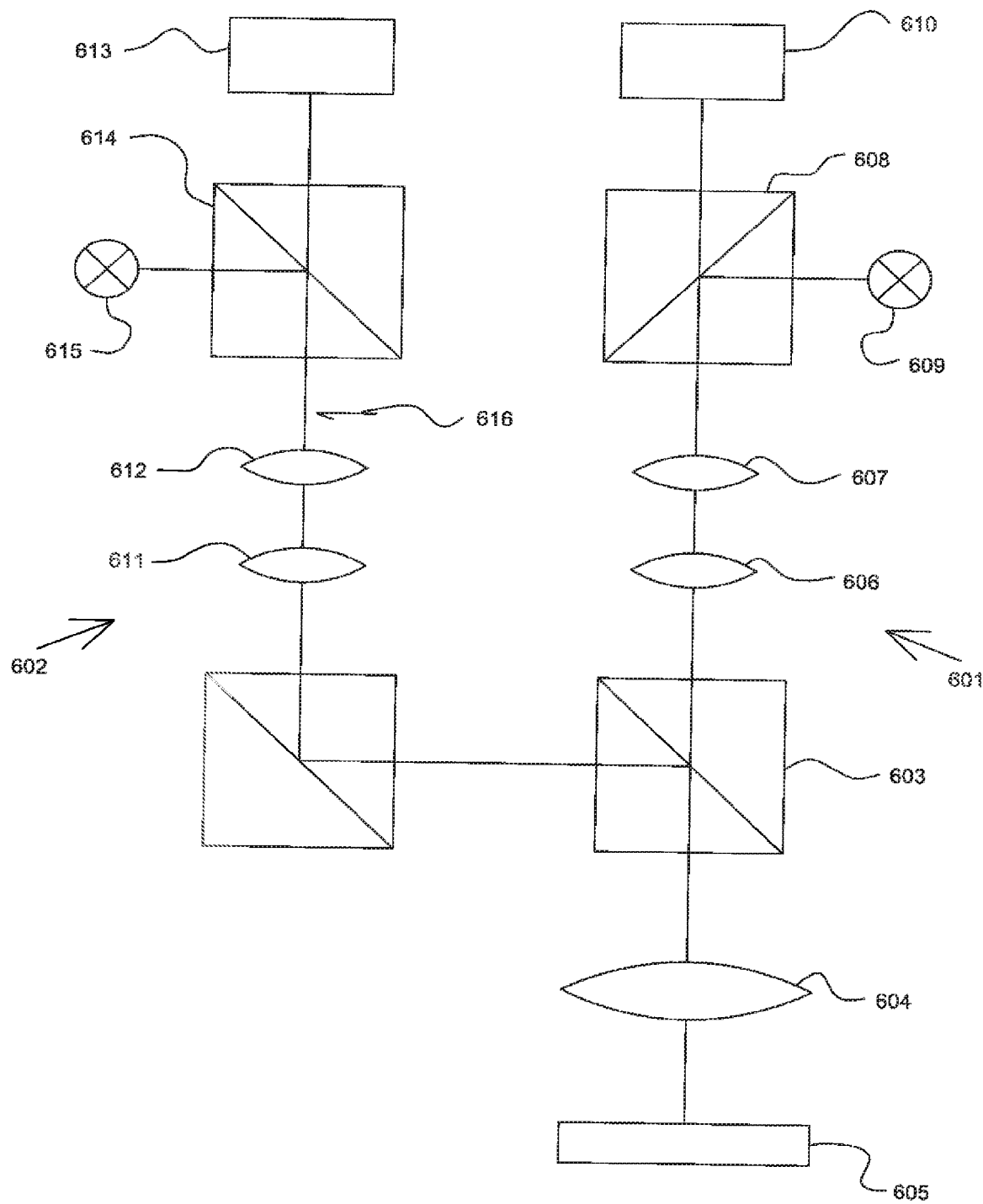
Figure 6:
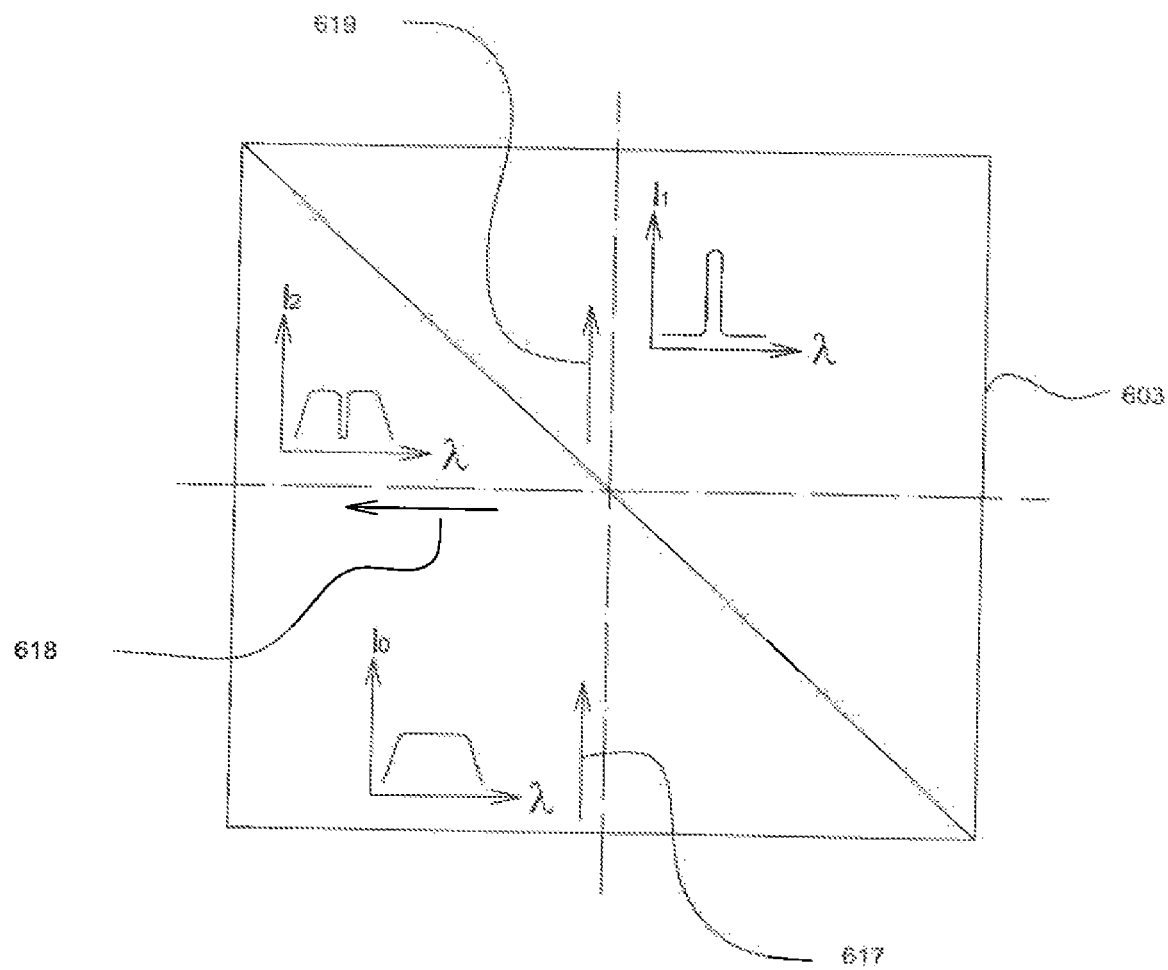
Figure 7:
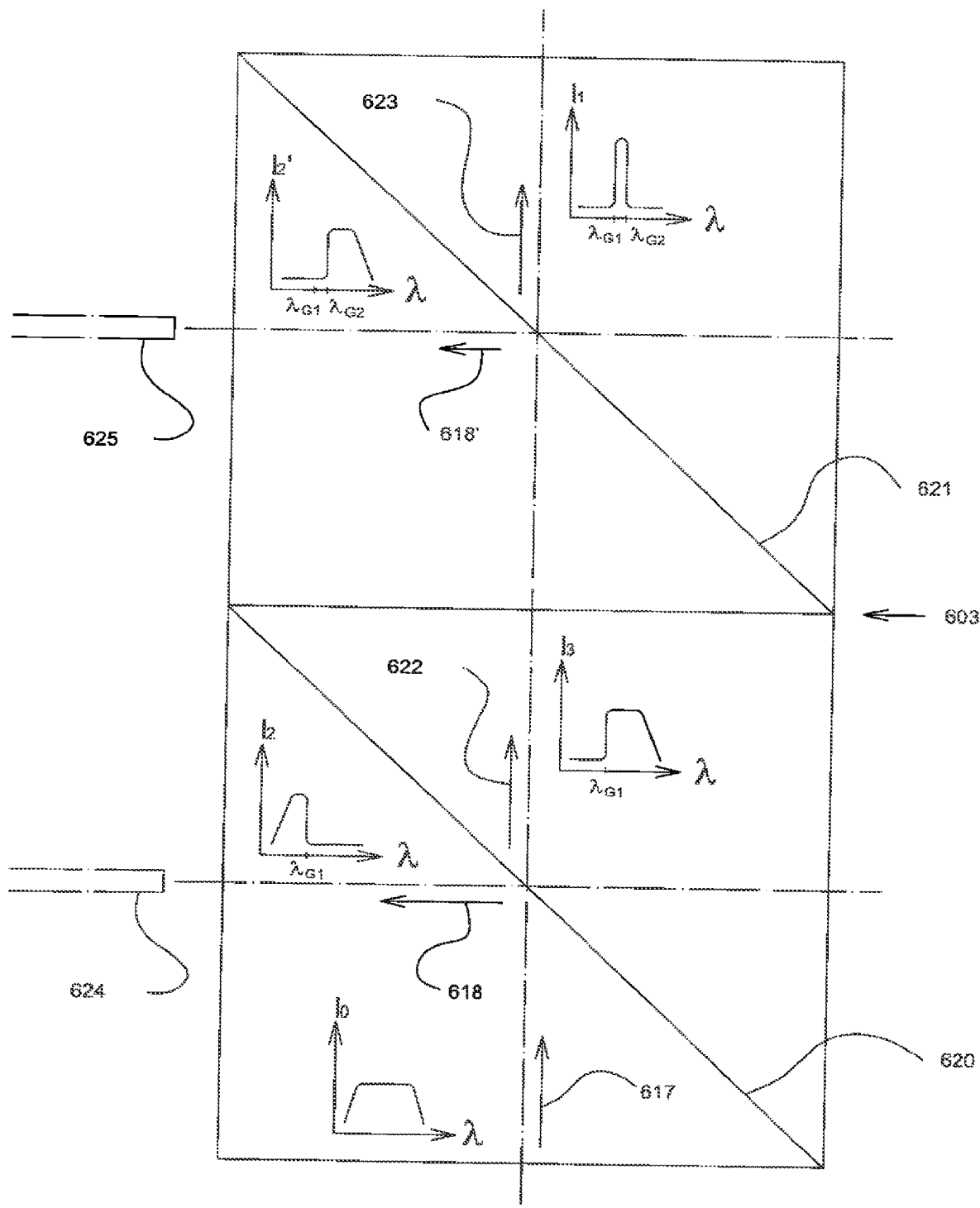
Figure 8:
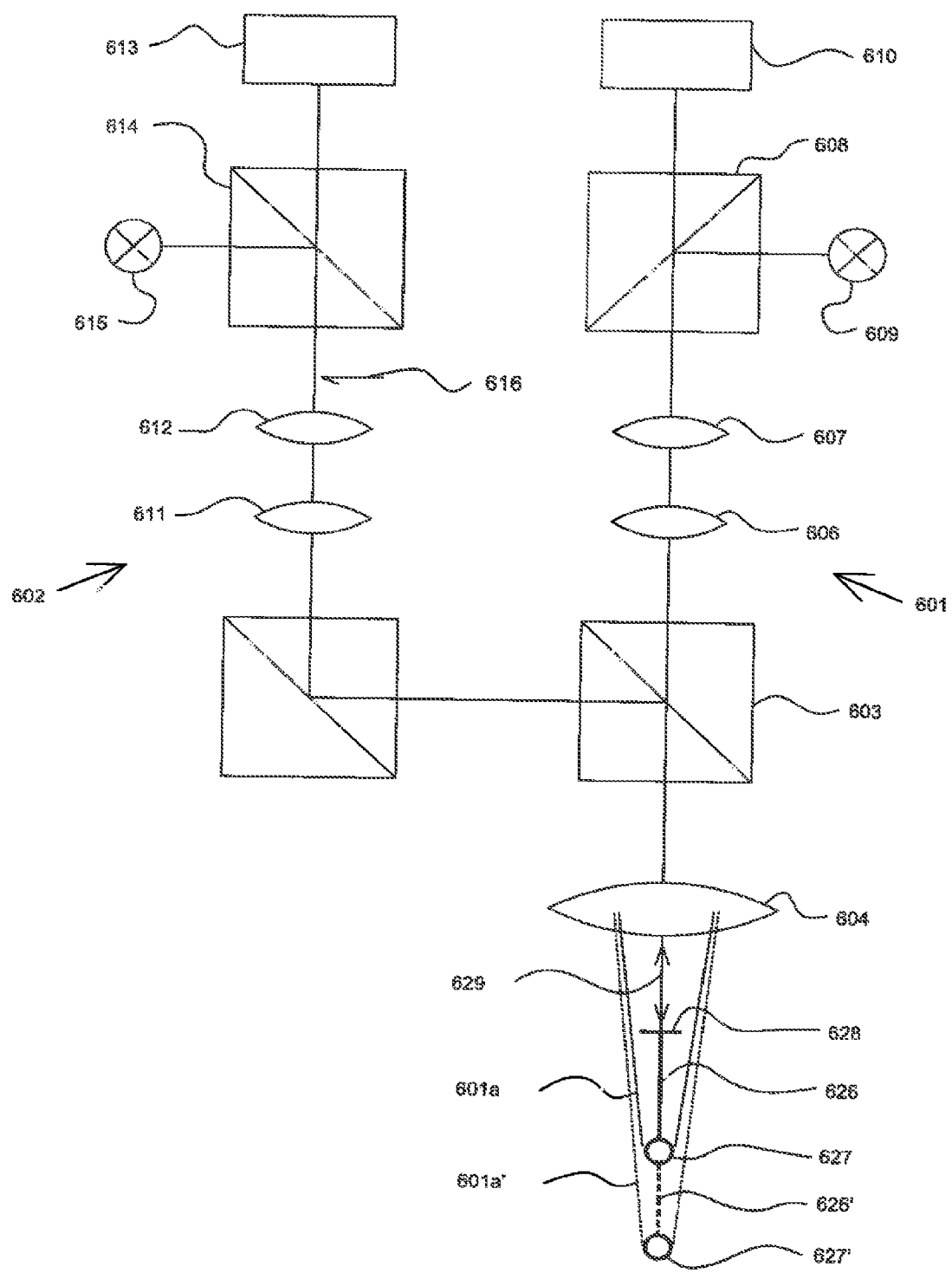
Figure 9:
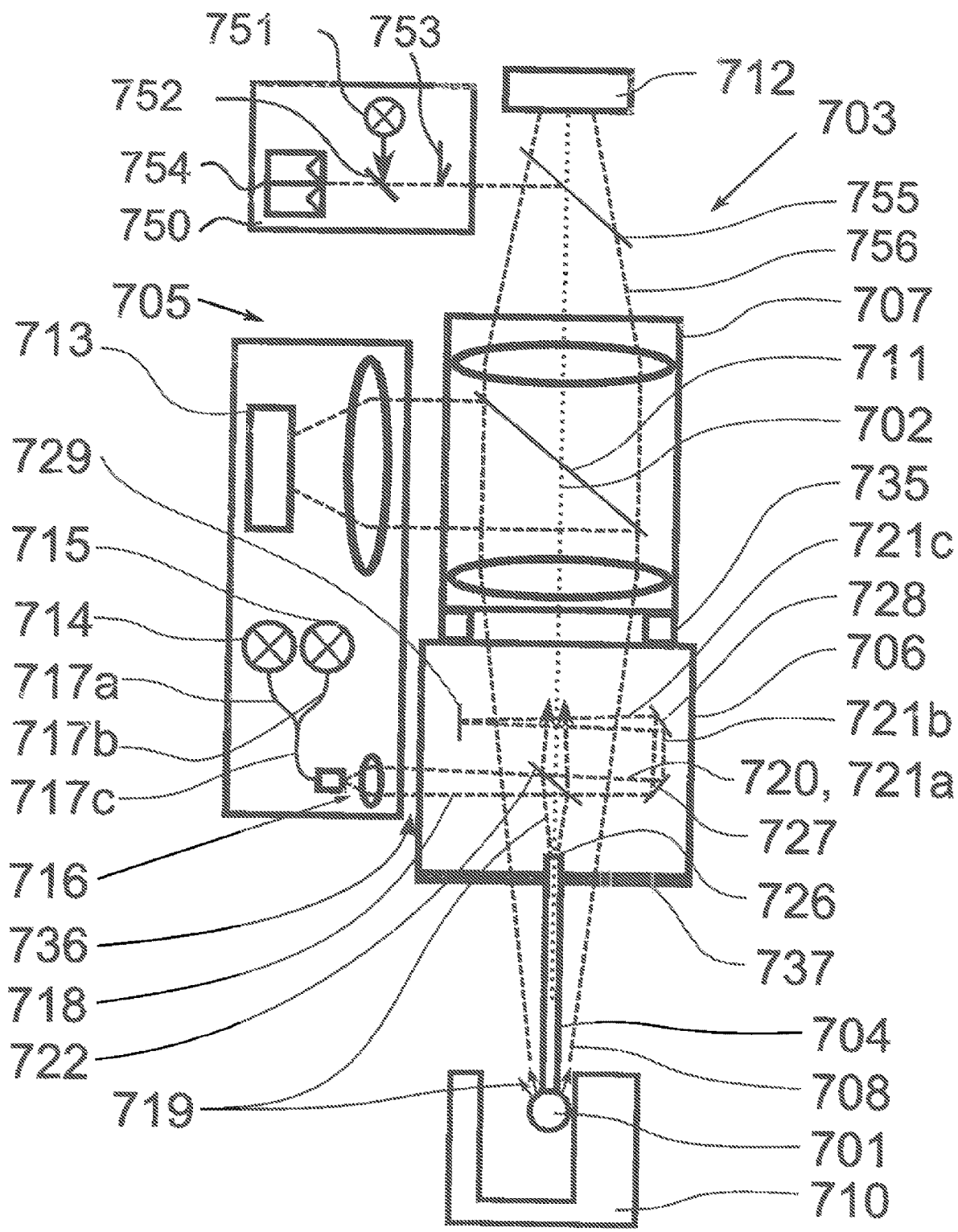

Shown are:

FIG. 1 A principle representation of a workpiece measured using the method according to the invention, mounted in a rotary fixture FIG. 2 A principle representation of the workpiece and the rotary/tilt device used for mechanically aligning the same, integrated in a coordinate measuring machine FIG. 3 A principle representation of segments to be measured of a region of a first workpiece and stylus shaft of the first sensor used for measuring in a suitable mechanical alignment FIG. 4 A principle representation of segments to be measured of a region of a second workpiece and stylus shaft of the first sensor used for measuring in a suitable mechanical alignment FIG. 5 A principle view of a device according to the invention for coupling two beam paths by means of a splitter FIG. 6 A first detail view of the splitter FIG. 7 A second detail view of the splitter FIG. 8 A further principle representation of a device according to the invention having a flexurally elastic stylus FIG. 9 A further principle representation of a device according to the invention having a first optical, interferometric distance sensor and a second optical distance sensor for capturing marks on a probe extension FIG. 1 shows as an example a simplified representation of a typical workpiece 1 in the form of a fuel injector for passenger cars or commercial vehicles and having a plurality of microgeometries implemented as openings, such as regions 2, in the example as a plurality of injection orifices 2 distributed at the circumference about the center axis 3d. The representation of the fuel injector is not complete, but rather is interrupted by dashed lines. Particularly the region below region 2 in the direction of the mechanical rotary axis 3 has a much more complex structure, but is only indicated here. The regions (injection orifices) 2 open at the bottom ends 6a thereof into a channel 5 present in the interior of the fuel injector and extend to the top ends 6b present at or near the surface 9 of the workpiece. In order to make the plurality of regions 2 accessible for measuring by means of a sensor, that is, to mechanically align said regions, the fuel injector 1 can rotate by means of a clamping fixture 4 on a rotating part 3a of a mechanical rotary axis 3 rotating about the axis of rotation 3d along the arrow 3c with respect to the stationary part 3b. The center axes of the injection orifices 2 in the example form approximately the same angle (elevation angle) to the central axis 3d. However, fuel injectors having injection orifices at different or even a plurality of elevation angles are also available, and the mechanical alignment must be performed very accurately for each region 2, so that the workpiece 1 is tilted by means of a mechanical tilt axis, not shown here, but in FIG. 2. The mechanical tilt axis 12 and mechanical rotary axis 3 often form a rotary/tilt device together.

An enlarged view of the top region of the fuel injector 1 is also indicated by the arrow 1'. The surface normal of surface 9 of the workpiece is labeled with the reference n and indicates the perpendicular to the surface 9 in the area directly surrounding each opening 2. The surface normal n is different from the surface normal 11 of a segment 7 shown in FIGS. 3 and 4.

FIG. 2 shows an example of a coordinate measuring machine 13 having a plurality of sensors 8, 21, 24, 23, 27, the rotary-tilting device, comprising a mechanical rotary axis 3 and a mechanical tilt axis 12, and the workpiece 1 fastened to the rotary-tilting device by means of the clamping fixture 4. The rotary/tilt device is mounted on the measuring table 14, and said table in turn proceeds from a base 15 displaceable in the Y direction by means of measurement axes. The two supports 16 on which the gantry 17 is mounted also proceed from the base 15. The carriage 18 is displaceable along the X direction of the gantry 17 by means of measurement axes. The two rams 19 and 20 proceed from the carriage 18 and are displaceable in the Z direction relative to the carriage 18 by means of measurement axes.

An image processing sensor 21, referred to here as the additional sensor, and a tactile/optical sensor comprising a probe extension 8 and image processing sensor 21, referred to here as the first sensor, are present on the first ram 19. The probe extension comprises a stylus shaft 8d, 8b, from which the contact shape element 8a and the target mark 8c proceed. The region 8d of the stylus shaft directly above the target mark 8c is flexurally elastic in segments, implemented as a glass fiber, for example. The deflection of the contact shape element 8a perpendicular to the stylus shaft axis due to contact with the segments of the workpiece 1 to be measured is transmitted to the target mark 8c by the largely flexurally rigid region 8b, due to the short length thereof, and is measured by capturing the target mark 8c by means of the image processing sensor 21.

An image processing sensor 23, a modified probe extension 24 comprising a second target mark 25 on the top end facing away from the contact shape element 8a, and an optical distance sensor 27 are also present on the second ram 20, together forming a further tactile/optical sensor, particularly a tactile/optical sensor for capturing the three-dimensional deflection of the contact shape element 8a. The target mark 25 is a reflector 25 implement at least partially as a reflecting surface and reflects the measurement beam of the additional distance sensor 27 back to the sensor 27. Said sensor thereby indirectly captures the deflection of the contact shape element 8a in the direction of the shaft axis of the stylus shaft 8d, 8b. The deflection perpendicular thereto is in turn implemented by capturing the target mark 8c by means of the image processing sensor 23. The distance sensor 27 and image processing sensor 23 thereby at least partially use the same imaging optic 28 or 22, as long as a distance sensor, not shown here, is also mounted on the first ram 19.

The use of two rams and the two sensor groups 8, 21 and 23, 24, 27 is only an example. All sensors 8, 21, 24, 23, 27 can also be mounted on one ram. The combination of sensors 8, 21, and 27 is also possible. In addition, the probe extensions 8 and 24 can each be set down in changeout magazines, not shown here, either manually or preferably automatically. The sensors 22, 23, and 27 can then also capture the surface of the object 1 independently of each other. The structures present in openings can also be partially captured by means of the image processing sensor 22, 23, as is explained below using FIG. 3.

The exemplary construction of the coordinate measuring machine 13 corresponds to the "fixed bridge" style, preferred for measuring microfeatures due to the high accuracy that can be achieved, without said style representing a limitation on the invention. Other styles such as "moving bridge", "tabletop units", "cantilever", or "stand" are also conceivable.

In order that each region 2 can be captured by one of the sensors, in addition to the translatory positioning by means of the measurement axes indicated above, the workpiece can be rotated by the rotary/tilt device, by means of the mechanical rotary axis 3 described above, and tilted. The tilting is performed by means of the mechanical tilt axis 12, allowing tilting of the tiltable part 12a in the direction of the arrow 12c about the tilt axis 12d with respect to the fixed part 12b. Translational and rotational motions are used for rough alignment and also for mechanical (fine) alignment. Rotation is needed, among other reasons, in order to transition from one region 2 to the next; tilting is used for adjusting to the elevation angle.

Figure 3A:
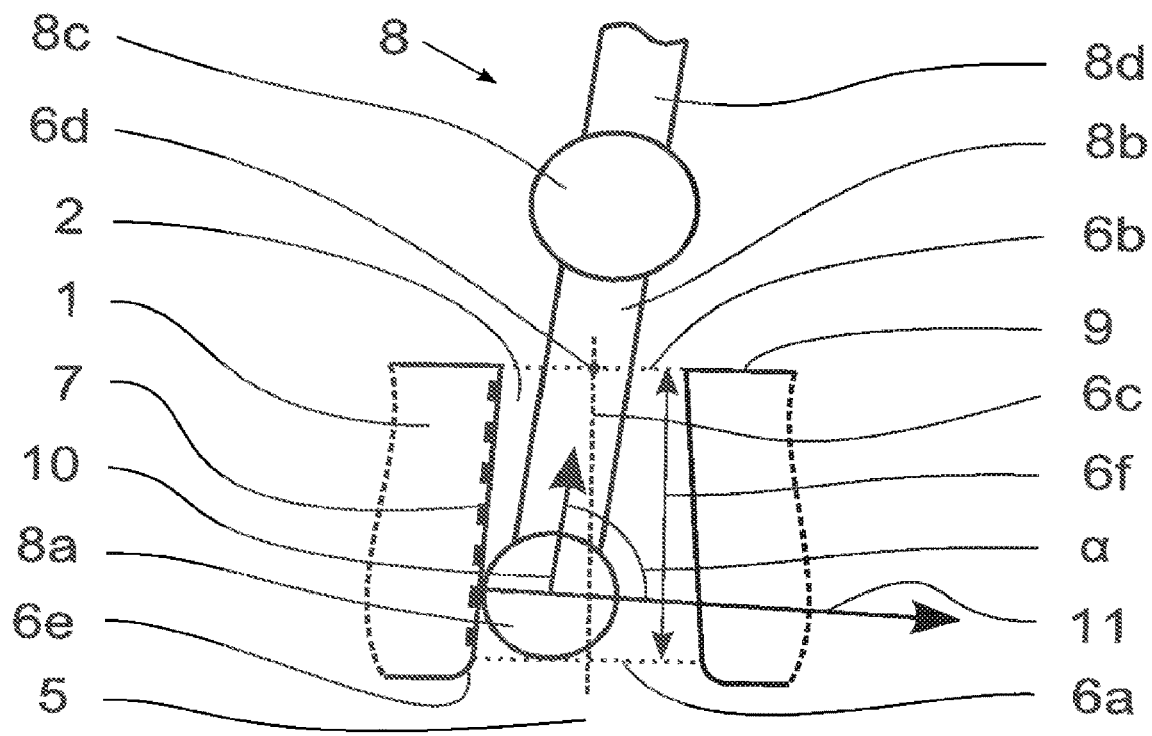
Figure 3B:
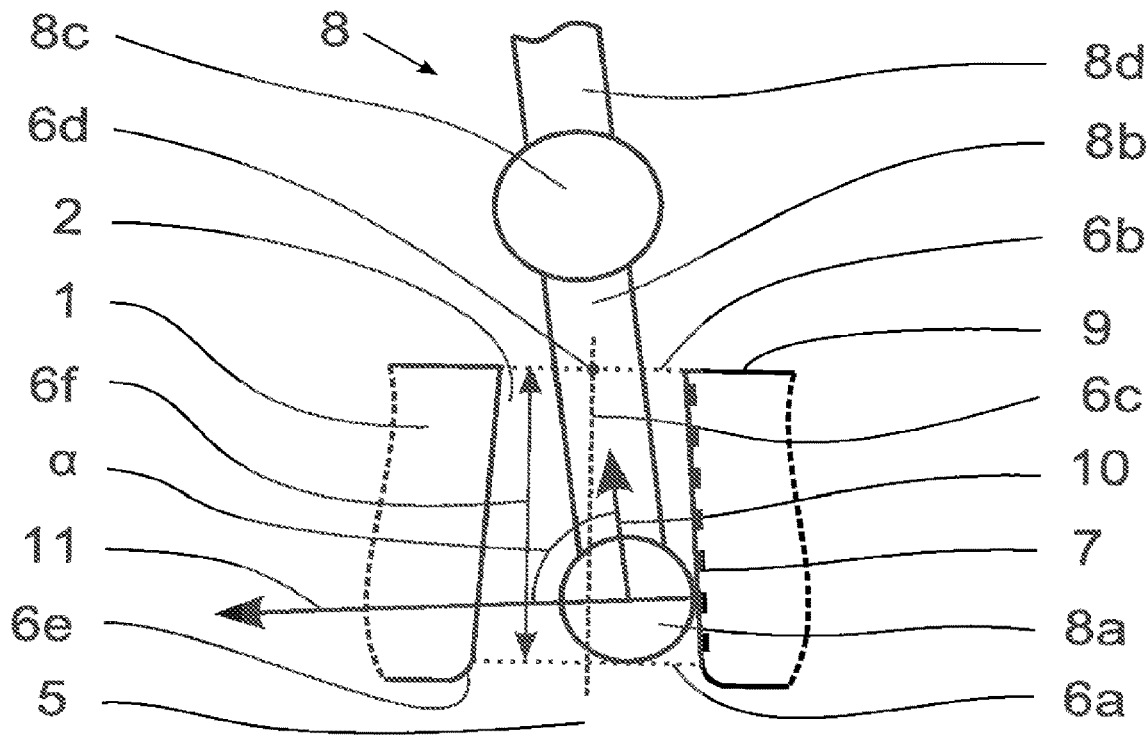

FIGS. 3a and 3b show the measuring of two segments 7 at the region 2, wherein a separate mechanical alignment has taken place beforehand for each. The rotational mechanical alignment was performed before the contact shape element 8a and the stylus shaft having the region 8b thereof entered the opening 2. Said alignment was necessary in order to pass through the two regions 7 safely without shaft contact, because the diameter of the region 2 increases in the direction toward the interior channel 5. A greater diameter is therefore present at the bottom end 6a of the region 2 than at the top end 6b, as is the case, for example, for injection orifices of diesel fuel injectors. The transition of the region 2 into the channel 5 comprises a rounding 6e. The maximum depth of the region 2 is labeled as 6f, the center axis as 6c, and the entry point into the opening 2, referred to as the center of the opening, as 6d.

The region 2 is implemented having a cone shape as an example. A cylindrical implementation is also conceivable. The region 7 to be measured is a surface line or conical surface line and extends in the direction of the center axis 6c projected onto the conical surface. In order for the contact shape element 8a to enter the opening 2 without collision and to measure measurement points as individual points or by scanning along the segment 7, the rotary mechanical alignment occurs beforehand so that the stylus shaft 8b runs away from the wall of the region 2 comprising the segment 7 when contacting the contact shape element 8a, so that an angle α is formed between the surface normal 11 of the segment 7 and the shaft axis 10 and is smaller than 90°. Preferably α is approximately 89.70, up to 89.5°, so that no shaft contact occurs even when the contact shape element 8a is deflected. If the angle is too small, there is a risk that shaft contact or collision will take place with the opposite wall of the region 2. Angles of precisely 90° are conceivable, but only for small deflections.

It must be noted that the parameter ratios of the diameter of the contact shape element 8a and the diameter and depth 6f of the region 2 are examples. In the case of injection orifices, the depth 6f and the diameter of the contact shape element are greater in comparison with the diameter of the region.

For example, the depth 6f is 0.7 mm to 1.2 mm, particularly 1 mm, the diameter in the regions 6a and 6b, or the average diameter between 6a and 6b, is 80 µm to 90 µm, particularly 90 µm, and the diameter of the contact shape element 8a is 20 µm to 80 µm, particularly 70 µm. The diameter of the preferably present target mark 8c is 80 µm to 120 µm, for example, particularly 95 µm, and the distance between the target mark 8c and the contact shape element 8a is 1.3 mm to 1.5 mm, preferably 1.5 mm.

Prior to the actual mechanical alignment, that is, the translational and rotational positioning, the location of the particular region must be determined, characterized by the location of the center axis 6c and position of the center of the opening 6d. A plurality of methods are provided to this end. Following a rough alignment using the specified data, for one of the methods according to the invention, the center point of the region 2 on the top side 6b is determined by measuring the circle by means of the image processing sensor 21. Alternatively, the determining can be performed by means of the tactile-optical first sensor, that is, in that the contact shape element 8a is inserted into the opening only slightly below the top side 6b. In addition, a second center point is determined by means of the tactile-optical first sensor at the height of the bottom end 6a or at about half the maximum depth 6f. The line connecting the two center points defines the center axis 6c. The measurements by means of the image processing sensor 21 are performed using transmitted light illumination, not shown, implemented by a diffuse light source introduced into the channel 5. Alternatively, surface lines are scanned continuously to half the maximum depth by means of the tactile/optical first sensor and a best-fit cylinder or best-fit cone is calculated, the axis thereof forming the center axis 6c. The center of the opening 6d is determined by determining a measurement point on the surface 9 of the workpiece near the opening 2 by means of the image processing sensor in autofocus mode or of the further distance sensor 27, wherein the probe extension 8 or 24 has preferably been set down or has been defocused by increasing the working distance of the image processing sensor 21 or distance sensor 27.

The (fine) mechanical alignment is performed subsequently using the surface normal 11 of the particular segment 7, resulting in the angle α, wherein the location of the segment 7 results from the specified data such as CAD data. The translational positioning into the opening 2 is performed only after the mechanical rotational alignment.

FIGS. 4a and 4b, similar to FIG. 3, show the measuring of two segments 7 at the region 2 of a second workpiece, wherein, however, no separate mechanical rotational alignment is performed for each segment, because the diameter of the region 2 decreases toward the interior, so that all regions 7 can be accessed while maintaining the same angle α in one rotary/tilt position of the rotary/tilt unit without shaft contact. The stylus shaft 10 is thereby aligned parallel to the center axis 6c. The second workpiece is, for example, a gasoline fuel injector and the regions 2 are the injection orifices thereof. The constant rotational alignment means that now further segments 7a in addition to the surface lines are measurable. Said segments can run along the circumference of the cone or arbitrarily within the region 2, such as a cone surface.

FIG. 5 shows the coupling of the first beam path 601 of the image processing sensor and the second beam path 602 of a distance sensor by means of the splitter 603. After joining, the two beam paths 601 and 602 travel a common beam path toward the workpiece 605, here comprises only the additional front optic 604 as an example, wherein the splitter 603 is also part of the common beam path. The first beam path 601 further comprises the two displaceable lens groups 606 and 607, and a further beam splitter 608 for coupling in the light from the light source 609, and the image sensor 610, such as a CCD or CMOS camera 610. The second beam path 602 comprises at least the displaceable lens groups 611 and 612. A light source 615 for coupling in via the beam splitter 614 is preferably also present in the second beam path 602. The receiver 613 is also part of the beam path 602 and is implement as a spectrometer in the case of a chromatic sensor and as a differential diode in the case of a Foucault sensor. In the case of the Foucault sensor, the knife edge 616 is also provided in the beam path 602.

For the case that the second beam path 602 comprises the chromatic sensor, the beam path can be implemented at least partially as an optical fiber between the lens groups 612 and the beam splitter 614, for example. The region between the splitter 603 and the lens group 611 can also be implemented at least partially as an optical fiber.

FIG. 6 shows a first embodiment of the device according to the invention with respect to the splitter 603. Said splitter is implemented such that light originating from the direction of the workpiece 605, being broad-band light $I_0$, is divided into a partial beam 618 having the spectral distribution $I_2$ in the direction of the second beam path 602 and the intensity $I_1$ in the partial beam 619, the latter being deflected into the first beam path 601 toward the image sensor 610. A greater spectral range for evaluating the distance is thereby made available to the chromatic sensor and the image processing sensor receives only a narrow spectral range having almost no chromatic errors. To this end, the splitter 603 has one or more special wavelength-selective layers.

An alternative embodiment of the splitter 603 is shown in FIG. 7. Said splitter is thereby a cascaded splitter having two splitting layers, particularly dichroic layers 620 and 621. The first dichroic layer 620 has the limit wavelength $\lambda_{G1}$ and the second dichroic layer 621 has the higher limit wavelength $\lambda_{G2}$. The first dichroic layer 620 thereby reflects the wavelength range below $\lambda_{G1}$ in the direction 618 of the second beam path and allows the spectral portion above $\lambda_{G1}$ to pass through in the direction 622 toward the second dichroic layer 621. The remaining spectral portion 13 of the beam 622 is again split at the dichroic layer 621, into the range above $\lambda_{G2}$ corresponding to the intensity $I_2$ in the direction of the arrow 618 into the second beam path, and the portion $I_1$ between the two limit wavelengths $\lambda_{G1}$ and $\lambda_{G2}$ in the direction of the arrow 623 into the first beam path in the direction toward the image sensor 610. The spectral range 618 is received by a fiber 624, for example, and the spectral range 618' is received by a second optical fiber 625, wherein said ranges are guided toward the spectrometer 613 in the second beam path of the chromatic sensor and preferably joined by means of a fiber coupler.

FIG. 8 shows an expansion of the representation in FIG. 5 as a flexurally elastic stylus 626 on the workpiece side in front of the front optic 604, for example disposed on a changeout interface, not shown, and automatically interchangeably connected to the optical beam path 601. The contact shape element 627 used for measuring the workpiece by contact proceeds from the stylus 626. The deflection perpendicular to the axis of the stylus 626, that is, perpendicular to the optical axis of the beam path 601, is captured by means of the first beam path, that of the image processing sensor 610, shown by examples of beams 601a of the first beam path. Instead of directly capturing the contact shape element 627, a mark on the stylus in the direction toward the front optic 604, that is, above the contact shape element 627, not shown here but referred to here as the second mark, can be captured by the image processing sensor. The first mark 628 further proceeds from the stylus 626, for example implemented as a coating of the stylus 626 implemented as a fiber or for example as an adhered mirror or partial mirror, wherein a partial mirror allows part of the light to pass through in order to enable illuminating the contact shape element 627 or the second mark, and reflects part of the light in order to make said light available for measuring. According to the invention, the second mark 628 serves for at least partially reflecting the measurement beam 629 of the second beam path, particularly of a distance sensor, in order to measure the deflection of the contact shape element 627 in the direction of the stylus axis. The beam path of the second sensor 602 is thereby deflected by the splitter 603 in the direction 629 toward the first mark 628 mounted at the top end of the stylus and is focused on the mark 628 by the front optic 604. A stylus 626' for installing selectively in place of the stylus 626 is show in dashed lines and comprises the contact shape element 627' and, for example, the second mark at the same location 628. In order that the contact shape element 627' or a second mark associated with the same can be imaged on the detector 610 by the image processing beam path 601, it is necessary to adjust the working distance at least by displacing the lens groups 606 and 607 or one of the two lens groups 606 and 607, so that the beams shown having the reference numeral 601a' capture the contact shape element 627'. In the example shown, the working distance of the second beam path, that of the distance sensor 602, must remain constant in order to capture the mark 628. According to the invention, however, the position of the mark 628 for the second stylus configuration, that is mark 628', is disposed at a position offset in the direction of the stylus axis, and thus the working distance of the second sensor 602 must also be adjustable by displacing the lens groups 611 and/or 612. If said displacement is not provided, however, then the adjustability of the lens groups 611 and 612 can be optionally eliminated or such lens groups not provided. As a substitute, however, a further lens or lens group can be provided in place of the lens groups 611 and 612 for setting a fixed working distance at the mark 628.

FIG. 9 shows a further principle representation of a device according to the invention, particularly a tactile/optical sensor, having a first optical interferometric distance sensor 705 and a second optical distance sensor 750 for capturing marks 701, 726 proceeding from a probe extension 704.

Measurements on the workpiece 710 are thereby performed by contacting by means of a contact shape element 701, said element being deflected when contacting the workpiece 710, and proceeding from a probe extension, particularly a flexurally elastic probe extension 704. The deflection or position of the contact shape element 701 or alternatively a mark disposed above the same, not shown, such as a spherical thickening of the probe extension 704 (both referred to as the first mark) is captured in the two lateral directions (X and Y direction, perpendicular to the optical axis 702 of the image processing sensor 703) by means of the image processing sensor 703, comprising the camera 712, as is sufficiently described in the prior art. In the vertical direction (Z direction), measurements occur simultaneously by means of two optical distance sensors 705 and 750, said measurements being combined according to the invention in order to associate a range of unambiguity with the measurement result of the first distance sensor 705.

The first optical distance sensor 705 is implements as an interferometer and captures the first mark 701 (contact shape element or first mark present above the same), here the contact shape element 701. The second optical distance sensor 705 is implemented as a Foucault sensor and captures the second mark 726 disposed at the top end of the probe extension 704 and implemented, for example, as a mirror, particularly as a partially permeable mirror, or a dichroic layer, in order to be at least partially permeable for light in the probe extension 704 preferably implemented as an optical fiber for illuminating (self-illuminating) the contact shape element 701 or the first mark for capturing by means of the image processing sensor 703, in addition to reflecting the measurement beam of the second distance sensor, after being reflected into the beam path 756, 708 of the image processing sensor 703 by means of an optical splitter such as a splitting mirror 755 and running along the optical axis thereof. The second optical distance sensor 750 comprises a light source 751 for generating a measurement beam, the optical splitter 752, the knife edge 753, and the differential diode arrangement 754 for evaluating the measurement beam reflected at the second mark 726 and deflected back into the second optical distance sensor 750 by means of the optical splitter 755. However, other optical distance sensors than the second optical distance sensor are also provided.

Further preferably associated with the tactile/optical sensor is an imaging optic 707, typically comprising a plurality of lenses and also potentially implemented as a zoom optic, optionally having a working distance adjustable independently of the zoom stage, in order to form at least one beam path 756, 708 along the optical axis 702 focused on the contact shape element 701 or a first mark associated therewith. The optical axis 702, the imaging optic 707, and the beam path 708, 756 are first associated with the laterally measuring optical sensor 703, but are then also subsequently used at least partially for the first interferometric distance sensor 705 and the second optical distance sensor 750.

As previously found thoroughly in the prior art, the shadowing of the contact shape element 701 or the first mark under transmitted light illumination or the self-illuminated contact shape element 701 or the self-illuminated first mark can be captured by means of the image processing sensor 703. In the context of the present specification, the second variant, know as self-illumination, is preferably used. Said self-illumination is generated in that light on the side 726 of the probe extension 704 facing away from the workpiece 710, that is, on the side of the probe extension further away from or facing away from the contact element, is coupled into the same and transmitted therein to the contact shape element 701 or, if present, to the first mark. To this end, the probe extension 704 is implemented for at least partially transmitting light, for example as a glass or plastic fiber. The contact shape element 701 and first mark are implemented by coating as known from the prior art, so as to emit the majority of the infed light captured by the imaging optic 707 and imaged in the direction of the evaluation units such as a camera 712 and receiver 713 of the sensors 703 and 705. To this end, the beam paths of both sensors run jointly to an optical splitter 711 and are guided thereby on one side in the direction of the analysis unit 712 of the laterally measuring sensor (image processing sensor) 703 and on the other side in the direction of the analysis unit 713 of the first optical, interferometric distance sensor 705. The optical splitter 711 is implemented as a splitting mirror such as a semitransparent film (pellicle) or as a splitter cube, for example. The analysis units 712, 713 are cameras having preferably planar receiver surfaces, such as CCD or CMOS cameras, for example, and optionally have additional imaging lenses connected upstream thereof. The light coupled into the probe extension for self-illuminating can be formed by the measurement beam 719 of the first interferometric distance sensor 705 and/or the measurement beam of the second optical distance sensor 750 and/or by a separate light source, not shown, the light thereof being reflected into the beam path 756 by a further optical splitter, also not shown.

In addition to the imaging optic 707 and the analysis units 713, the light sources 714 and 715, the optical fibers 717a, 717b, and 717c, and a coupling arrangement 716 are associated with the vertically measuring, interferometric, first topical distance sensor 705. The latter typically comprises a fiber end having a beam-shaping optic connected upstream and couples the beam 718 from the light sources 714 and 715 out of the optical fiber 717c, so that coupling into the probe extension 704 is made possible. The light from the two light sources 714 and 715 is combined by a Y-coupler connecting the optical fibers 717a and 717b to the optical fiber 717c. The light sources 714 and 715, the optical fibers 717a, 717b, and 717c, and the coupling arrangement 716 can also alternatively be disposed directly in the unit 706. In an alternative embodiment to the embodiment as a heterodyne interferometer having two light sources 714 and 715 of different spectrum, particularly different narrow-band wavelengths, the embodiment as a homodyne interferometer is also provided, wherein only one light source 714 emits narrow-band light, said light being coupled in by means of an optical fiber 717a and the coupling arrangement 716.

The preferably interchangeable or change-out unit 706 comprises the probe extension 704, means 737 for mounting the probe extension 704, means 722 for splitting the beam 718 into the measurement beam 719 in the direction of the side 726 of the probe extension 704 facing away from the workpiece 710, and means 727, 728, 729, such as reflectors for forming a reference beam path 721a, 721b, 721c, wherein the reference beam thereby runs partially inclined, particularly perpendicular, to the optical axis (segments 721a. 721c) and partially parallel to the optical axis (segment 721b), and is thus folded (deflected) multiple times. The reflectors 727, 728, and 729 are thereby present outside of the beam path 708, particularly laterally adjacent to the optical beam path 708.

The unit 706 further comprises means, not shown, such as permanent magnets, for releasably mounting on a changeout interface 735. The coupling of the beam 718 preferably takes place laterally to the unit 706 at an interface 736 implemented as an opening, for example, but can also take place within the changeout interface 735. An additional deflection of the beam 718 may then be necessary. If the light sources 714 and 715, the optical fibers 717a, 717b, and 717c, and the coupling arrangement 716 are disposed directly in the unit 706, the required electrical infeeds to the light sources 714 and 715 are routed via the changeout interface 735.

The measurement beam 719 exiting the contact shape element is captured by the imaging optic 707 and deflected to the analysis unit 713 by means of the optical splitter 711. The superposition (interference) is thereby performed with the reference beam path 720 running in the same direction after being reflected by the deflecting mirrors 727, 728, 729, 728 again, 727 again, and the splitter 722.

If, in contrast to the tactile/optical measurement mode described thus far with reference to FIG. 9, measurement points (surface points) are directly captured and measured in the previously mentioned first or second measurement mode on the surface of the workpiece 710 jointly by means of the two optical distance sensors 705, 750 (first measurement mode), or separately (second measurement mode), then according to the invention the probe extension 704 is removed, preferably automatically set down in a parking station, in that the entire unit 706 is removed and preferably automatically set down in a parking station. For the beam direction of the beam 718 shown here, a unit 706a, not shown, must be disposed in place of the unit 706, at least for measuring using the first optical distance sensor 705, said unit comprising the optical splitter 722 and the deflecting devices 727, 728, and 729. According to the invention, however, for the first optical distance sensor, such sensors are also provided wherein the reference beam path is guided outside of the unit 706, whereby only the optical splitter 722 is provided in the unit 706a, or wherein the beam direction of the beam 718 also already runs outside the unit 706 in the direction of the optical axis 702, whereby a unit 706a is not required.

The invention claimed is:

1. A coordinate measuring device for determining geometric features by measuring surface measurement points on a workpiece, comprising:
   an image processing sensor as a first sensor, and being associated with an image processing sensor beam path as a first beam path,
   a chromatic distance sensor as a second sensor, and being associated with a second beam path,
   a wavelength selecting splitter that couples the first beam path and the second beam path to form a common beam path,
   wherein the common beam path consists of the wavelength selecting splitter and a front optic having chromatic longitudinal flaws,
   wherein light passing through the front optic from the direction of the workpiece to be measured is at least partially coupled out of the common beam path into the second beam path,
   wherein the image processing sensor and the chromatic distance sensor directly measure the workpiece surface and/or determine the deflection of a mark, or one mark each, associated with a flexurally elastic probe stylus,
   wherein the selective wavelength splitter guides a narrow band spectral range no greater than 100 nm into the first sensor, and guides a broad-band spectral range of the light, or a plurality of spectral ranges of the light, into the second beam path, or the light which is not guided toward the first sensor is guided into the second beam path.

2. The device according to claim 1,
   wherein the image processing sensor comprises an image sensor such as a CCD or CMOS camera and at least two separate displaceable lenses or lens groups are disposed in the first beam path between the image sensor and the splitter and/or between the front optic and the splitter for independently adjusting the working distance and imaging scale.

3. The device according to claim 1,
   wherein a detector sensitive to wavelength is disposed in the second beam path, and wherein at least one splitter is selective of wavelength such that only a limited wavelength range from the spectrum of the light coming from the direction of the workpiece and impinging on the splitter is guided toward the image sensor of the image processing beam path, wherein a splitter is implemented such that said splitter reflects or passes the limited wavelength range above an upper wavelength limit, or wherein a splitter is implemented such that said splitter reflects or passes a limited wavelength range below a lower wavelength limit, or wherein a splitter is implemented as a band-pass or band-stop filter, such that said splitter reflects or passes the limited wavelength range above a lower wavelength limit and below an upper wavelength limit.

4. The device according to claim 3, wherein the upper wavelength limit is greater than approximately 600 nanometers, whereby substantially red light passes toward the image sensor, and/or wherein the lower wavelength limit is less than approximately 500 nanometers, whereby substantially blue light passes toward the image sensor, and wherein the wavelength range is nearly monochromatic, and comprises a spectral width of no greater than 50 nanometers.

5. The device according to claim 3, wherein the splitter is dichroic, and/or wherein the splitter comprises at least one interference filter, and/or the wavelength-selective splitter is dichroic or is a color filter.

6. The device according to claim 3, wherein the detector sensitive to wavelength is a spectrometer.

7. The device according to claim 1, wherein a neutral splitter for coupling the second beam path is disposed between the at least one wavelength-selective splitter and the front optic, wherein the second beam path comprises a broadband light source, the light thereof being coupled toward the workpiece.

8. The device according to claim 1, wherein at least one broadband light source and means for coupling into the first and/or second beam path are present for illuminating the region of the workpiece or probe stylus captured by the front optic, and at least one further light source and means for coupling into the first and/or second beam path are present, wherein the spectral portion of the further light source largely overlaps the adjacent wavelength range guided toward the image sensor by the wavelength-selective splitter.

9. The device according to claim 1, wherein a detector sensitive to wavelength is disposed in the second beam path, and wherein two dichroic wavelength-sensitive splitters are disposed one after the other in the common beam path and each split the spectrum of the light impinging on the splitters from the direction of the workpiece at a limit wavelength, thus reflecting above said limit and passing below said limit or vice versa, wherein the two splitters have different limit wavelengths, the difference between the limit wavelengths being less than 50 nanometers, and wherein the spectral range between the limit wavelengths is guided toward the image sensors and the remaining spectral range is guided toward the wavelength-sensitive detector.

10. The device according to claim 9, wherein the light of the two spectral ranges not guided toward the image sensor:

is coupled into different optical fibers, wherein each optical fiber leads to a separate wavelength-sensitive detector or optical fibers are coupled and guided to a wavelength-sensitive detector, or is deflected by setting the inclination of the dichroic splitter, wherein the corresponding light is light reflected at the dichroic splitter, and/or by a deflecting mirror and/or optic, to largely the same range as a wavelength-sensitive detector or is coupled into an optical fiber leading to a wavelength-sensitive detector.

11. The device according to claim 9, wherein the detector sensitive to wavelength is a spectrometer.

12. The device according to claim 1, wherein the first and second beam path and thus the first and second sensor comprise different working distances relative to the front optic, wherein the working distance of the image processing sensor can be set independently of the working distance of the second sensor.

13. The device according to claim 12, wherein the second beam path comprises at least one lens or lens group by means of which a working distance deviating from, and being shorter than, the beam path of the image processing sensor, is implemented.

14. The device according to claim 1, wherein the second beam path comprises at least two separate displaceable lenses or lens groups for independently setting the working distance and imaging scale, wherein lenses or lens groups of the second beam path are displaceable independently of lenses or lens groups of the first beam path or at least one lens or lens group of the first beam path is displaceable together with at least one lens or lens group of the second beam path.

15. The device according to claim 1, wherein a flexurally elastic probe stylus having at least one contact shape element for contacting the workpiece is or can be disposed in front of the front optic, wherein the probe stylus comprises at least one first mark associated with the probe stylus or contact shape element, said mark being captured by the second beam path of the optical distance sensor, and wherein the contact shape element or a second mark is captured by the beam path of the image processing sensor and wherein the first and second sensor have different working distances with respect to the front optic.

16. The device according to claim 15, wherein said at least one first mark is associated with the top end of the probe stylus.

17. The device according to claim 15, wherein the probe stylus comprises a second mark associated with the probe stylus or contact shape element and disposed on the probe stylus above the contact shape element.

18. A method for determining geometric features, particularly surface measurement points on a workpiece using the device according to claim 1, wherein measurement points are recorded directly on the surface of the workpiece, selectively, by means of the image processing sensor or the chromatic sensor, wherein only a narrow-band spectral range of the light reflected by the workpiece is guided to the image sensor or image processing sensor by means of at least one wavelength-selective splitter for analysis, and a broad-band spectral range or plurality of broad-band spectral ranges of the light reflected by the workpiece is guided to the chromatic sensor by means of a wavelength-selective or neutral splitter for analysis.

19. A method for determining geometric features, particularly surface measurement points on a workpiece using the device according to claim 18,
- wherein measurement points are recorded when the contact shape element makes contact with the workpiece,
- wherein probe styli of different lengths can be used, and the working distance of the image processing sensor is adapted to the length of the particular probe stylus being used by separately adjusting at least two lenses or lens groups present in the first beam path.

20. The device according to claim 19,
- wherein lenses or lens groups of the first beam path are displaced independently of lenses or lens groups of the second beam path, or
- at least one lens or lens group of the first beam path is displaced together with at least one lens or lens group of the second beam path, or
- one lens or lens group of the first beam path is displaced together with one lens or lens group of the second beam path.

21. The device according to claim 18, wherein the narrow-band spectral range of the light reflected by the workpiece is no greater than 50 nanometers wide.

* * * * *